(12) United States Patent
Snider et al.

(10) Patent No.: US 7,720,377 B2
(45) Date of Patent: May 18, 2010

(54) COMPUTE CLUSTERS EMPLOYING PHOTONIC INTERCONNECTIONS FOR TRANSMITTING OPTICAL SIGNALS BETWEEN COMPUTE CLUSTER NODES

(75) Inventors: Gregory S. Snider, Mountain View, CA (US); Raymond Beausoleil, Redmond, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1076 days.

(21) Appl. No.: 11/337,328

(22) Filed: Jan. 23, 2006

(65) Prior Publication Data

US 2007/0172235 A1 Jul. 26, 2007

(51) Int. Cl.
*H04J 14/00* (2006.01)
(52) U.S. Cl. .............................. 398/45; 398/46; 398/47; 398/48; 398/50; 398/51; 398/54; 398/56; 398/58; 385/16; 385/17; 385/18; 385/24; 370/389; 370/390; 370/392; 370/352; 370/432
(58) Field of Classification Search .................. 398/59, 398/60, 61, 62, 63, 66, 67, 68, 69, 70, 71, 398/72, 79, 83, 82, 45, 46, 47, 48, 49, 50, 398/51, 52, 53, 54, 55, 56, 154, 155; 385/24, 385/37, 16, 17, 18, 46, 14, 15; 370/389, 370/352, 465, 390, 392, 468, 432
See application file for complete search history.

(56) References Cited

U.S. PATENT DOCUMENTS 5,717,795 A * 2/1998 Sharma et al. ................. 385/24

6,222,654 B1 * 4/2001 Frigo ........................... 398/83
7,130,540 B2 * 10/2006 Simmons et al. ............... 398/49
2005/0213973 A1 * 9/2005 Rohrer et al. ................. 398/60

FOREIGN PATENT DOCUMENTS

EP        1087635       3/2001
WO   WO2004052045     6/2004

OTHER PUBLICATIONS

K-1 Yukimatsu et al—"Optical Interconnections in Switching System"— IEICE Transactions on Electronics vol E77-c, No. 1—Jan. 1994 pp. 2-8.
R Voelkel et al—"Optical Backplane for a Broadband Switching System"—Electronics Letters vol. 31 No. 3 Feb. 2, 1995—pp. 234-235.

* cited by examiner

*Primary Examiner*—Hanh Phan

(57) ABSTRACT

Various embodiments of the present invention are directed to photonic-interconnection-based compute clusters that provide high-speed, high-bandwidth interconnections between compute cluster nodes. In one embodiment of the present invention, the compute cluster includes a photonic interconnection having one or more optical transmission paths for transmitting independent frequency channels within an optical signal to each node in a set of nodes. The compute cluster includes one or more photonic-interconnection-based writers, each writer associated with a particular node, and each writer encoding information generated by the node into one of the independent frequency channels. A switch fabric directs the information encoded in the independent frequency channels to one or more nodes in the compute cluster. The compute cluster also includes one or more photonic-interconnection-based readers, each reader associated with a particular node, and each reader extracting the information encoded in the independent frequency channels directed to the node for processing.

20 Claims, 24 Drawing Sheets

– Prior Art –

– Prior Art –

| | Input | Output | | | |
|---|---|---|---|---|---|
| $MUX_0$ | $e_0$ | $e_0$ | $e_1$ | $e_2$ | $e_3$ |
| $MUX_1$ | $e_1$ | $e_3$ | $e_0$ | $e_1$ | $e_2$ |
| $MUX_2$ | $e_2$ | $e_2$ | $e_3$ | $e_0$ | $e_1$ |
| $MUX_3$ | $e_3$ | $e_1$ | $e_2$ | $e_3$ | $e_0$ |

COMPUTE CLUSTERS EMPLOYING PHOTONIC INTERCONNECTIONS FOR TRANSMITTING OPTICAL SIGNALS BETWEEN COMPUTE CLUSTER NODES

TECHNICAL FIELD

The present invention relates to compute clusters, and, in particular, to photonic-interconnection-based compute clusters that include optical transmission paths for transmitting data encoded in frequency channels of an optical signal between compute cluster nodes.

BACKGROUND OF THE INVENTION

Recent developments in distributed computing platforms, called "compute clusters," show that considerable progress has been made in increasing data processing speed and reducing platform sizes. In general, a compute cluster comprises a number of interconnected nodes, each of which is capable of performing a number of independent data processing tasks. A node can be a processor, memory, computer server, storage server, an external network connection or any other data processing or data transmitting device. Compute clusters are typically employed in either data reduction applications or data generation applications. In data reduction applications, large input data sets, such as data provided by a scientific instrument, are processed by identifying patterns and/or producing aggregate statistical descriptions of the input data. For example, in order to analyze and interpret the large amounts of image data obtained from an optical scan of a microarray, the image data can be reduced to smaller aggregate statistical descriptions. In data generation applications, small input data sets typically provide initial conditions for simulations that generate large output data sets that can be further analyzed or visualized. Combustion models, weather prediction, and computer graphics applications that generate animated films are examples of data generation applications.

Compute cluster applications are typically partitioned into hundreds, thousands or even millions of tasks by identifying specific individual tasks that can each be independently performed. Applications are often partitioned by a message-passing interface computer program and execution environment. Tasks can be distributed to different nodes based on the following criteria: (1) the order in which each task is received, (2) the configuration of the nodes in the cluster, (3) the computational demand of each task, (4) the amount of memory needed for each task, (4) the amount of data transmitted between nodes, and (5) the input/output requirements of the application.

Compute cluster nodes are typically interconnected via a network of high-speed, low latency, electrical interconnections that transmit data between nodes through a switch fabric. FIG. 1A illustrates a representation of a 4-node switch-fabric architecture 100. In FIG. 1A, physical nodes are interconnected via a switch fabric 102, where each physical node is represented by a first virtual node and a second virtual node. The first virtual node represents an input connection with the switch fabric 102, and the second virtual node represents an output connection with the switch fabric 102. For example, an input connection between physical Node 0 and the switch fabric 102 is represented by a rectangle 104 and a directional arrow 106, and an output connection between the switch fabric 102 and the physical Node 0 106 is represented by a rectangle 108 and a directional arrow 110. Switch fabrics provide interconnections so that nodes can simultaneously transmit data to different nodes in the compute cluster. For example, the switch fabric 102 provides interconnections so that the Node 1 can be simultaneously transmit data to the Node 2 and the Node 3, as indicated by dashed-line directional arrows 112 and 114.

The data processed by each node is typically partitioned into smaller fixed-sized packets that are then distributed through the switch fabric to particular nodes for processing. FIG. 1B illustrates an example implementation of the switch fabric 102, shown in FIG. 1A. In FIG. 1B, the switch fabric 102 includes input and output line cards, such as an input line card 118 and output line card 120, a permutation network 122, and an arbiter 124. Data is first transmitted from the nodes to the input line cards. The input line card partitions the data streams into fixed size packets. The packets are then transmitted to the switch fabric 102 and distributed to one or more first-in-first-out electronic-based data structures called "virtual queues." The arbiter 124 receives information regarding the packets stored at the head of each virtual queue and accordingly configures the interconnections within the permutation network 122 to distribute a first batch of packets stored at the head of each virtual queue to particular nodes. The output line cards assemble the packets received by the permutation network 120 and transmit the assembled packets to nodes for processing. After the arbiter 124 has distributed the first batch of packets, the arbiter 124 reconfigures the permutation network 120 in order to distribute a second batch of packets stored at the head of each virtual queue for processing.

In general, switch fabrics uniformly distribute data between nodes. However, compute clusters often have a number of nodes that exchange large amounts of data more frequently than other nodes, and the low latency interconnections provided by switch fabrics have limited bandwidths. As a result, the amount of data that can be transmitted between nodes is not well matched to the data transfer needs of the particular nodes at each point in time, resulting in data processing delays. In addition, arbiters can delay data processing, because arbiters typically rely on receiving information regarding all packets located at the head of each queue before distributing a batch of packets. Manufacturers, designers, and users of compute clusters have recognized a need for an interconnection architecture that provides large bandwidth, high-speed interconnections, and a switch fabric that does not rely on an arbiter to distribute packets.

SUMMARY OF THE INVENTION

Various embodiments of the present invention are directed to photonic-interconnection-based compute clusters that provide high-speed, high-bandwidth interconnections between compute cluster nodes. In one embodiment of the present invention, the compute cluster includes a photonic interconnection having one or more optical transmission paths for transmitting independent frequency channels within an optical signal to each node in a set of nodes. The compute cluster includes one or more photonic-interconnection-based writers, each writer associated with a particular node, and each writer encoding information generated by the node into one of the independent frequency channels. A switch fabric directs the information encoded in the independent frequency channels to one or more nodes in the compute cluster. The compute cluster also includes one or more photonic-interconnection-based readers, each reader associated with a particular node, and each reader extracting the information encoded in the independent frequency channels directed to the node for processing.

DETAILED DESCRIPTION OF THE INVENTION

Various embodiments of the present invention are directed to photonic-interconnection-based compute clusters that provide high-speed, high-bandwidth photonic interconnections for transmitting data with a compute cluster. The photonic interconnections include optical transmission paths for transmitting an optical signal from an optical signal source to one or more compute cluster nodes. The optical signal includes numerous, independent electromagnetic waves called "frequency channels" that can each be separately modulated to encode data that can then be directed to particular nodes in the compute cluster. Each node is connected to a first filter that extracts a first frequency channel encoding data directed to the node, and each node is connected to a second filter that can be used to encode data directed to a different node in the compute cluster by modulating a second frequency channel. A switch fabric can be included to direct data through frequency channels to nodes. A single external optical source can be used to generate the optical signal, avoiding separate, node-associated optical-signal sources.

The present invention is described below in the subsections: (1) an overview of photonic crystals and waveguides, (2) an overview of encoding data in electromagnetic waves, and (3) embodiments of the present invention.

An Overview of Photonic Crystals and Waveguides

Figure 2:
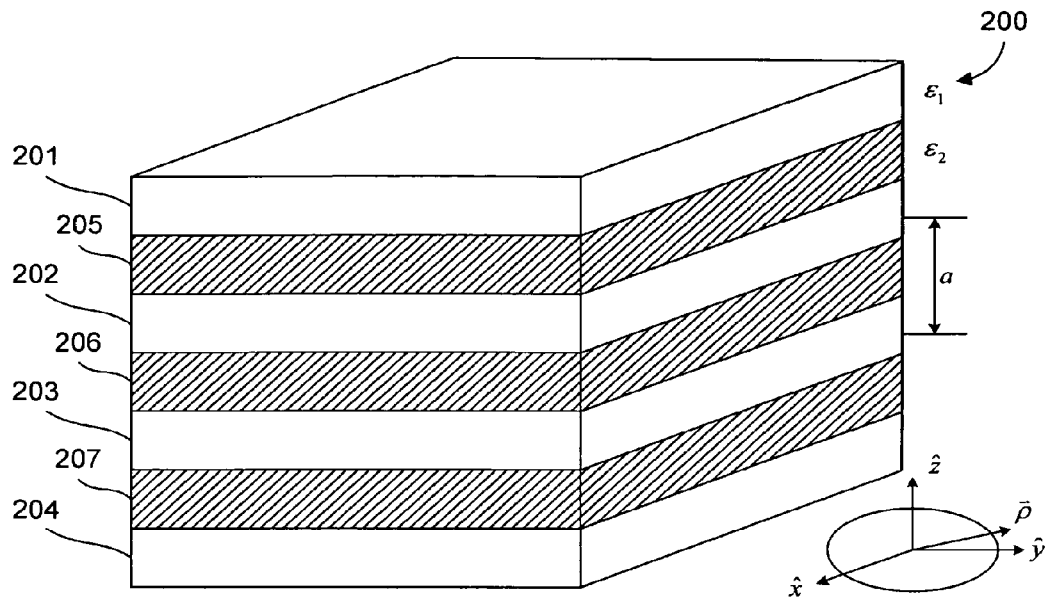
FIG. 2 illustrates an example of a one-dimensional photonic crystal.
Figure 3:
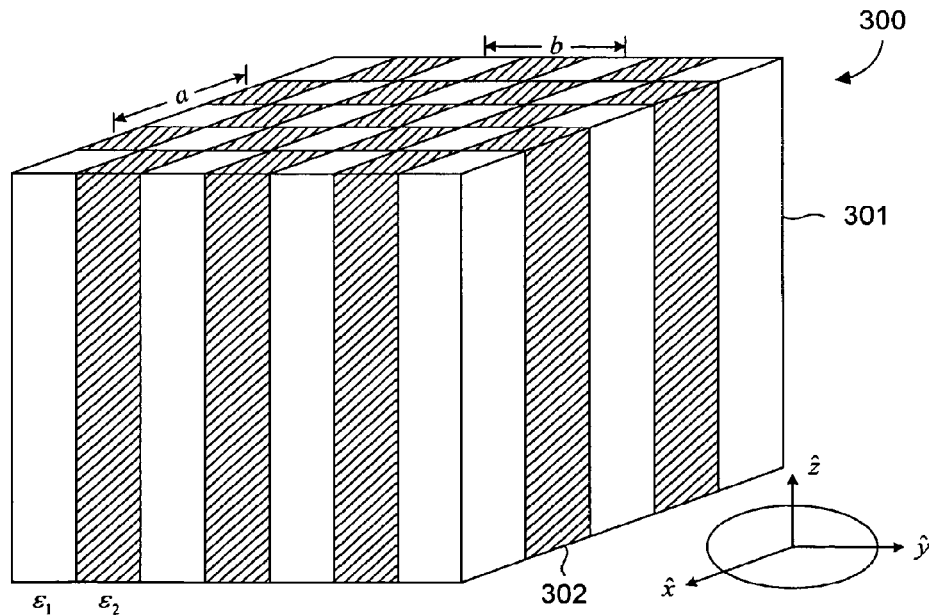
FIG. 3 illustrates an example of a two-dimensional photonic crystal.

Photonic crystals are optical devices composed of two or more different materials with dielectric properties that, when combined together in a regular pattern, can modify the propagation characteristics of electromagnetic radiation ("ER"). FIGS. 2 and 3 illustrate two of many different possible patterns in which two different materials with different dielectric properties can be combined to form a photonic crystal. Photonic crystals are typically identified by the number of directions in which the dielectric pattern is periodic. For example, FIG. 2 illustrates an example of a one-dimensional photonic crystal. In FIG. 2, a photonic crystal 200 is composed of seven layers of two different dielectrics that alternate periodically in the z-direction. Unshaded layers 201-204 are composed of a first dielectric having a dielectric constant $\in_1$, and hash-marked layers 205-207 are composed of a second dielectric having a different dielectric constant $\in_2$. The layers are regularly spaced with a repeat distance called a "lattice constant," in the case of the lattice constant shown in FIG. 2, lattice constant a. FIG. 3 illustrates an example of a two-dimensional photonic crystal. The two-dimensional photonic crystal 300 comprises alternating layers of two different dielectrics, and is periodic in both the x-direction and the y-direction with two lattice constants a and b. Unshaded regions, such as region 301, are composed of a first dielectric having dielectric constant $\in_1$, and hash-marked regions, such as region 302, are composed of a second dielectric having a different dielectric constant $\in_2$. Photonic crystals can also be fabricated with repeating patterns in three dimensions. Three-dimensional photonic crystals can be fabricated using spheres, tubes, or other solid shapes comprising a first dielectric embedded in a slab comprising a second dielectric.

ER propagating in a dielectric can be characterized by electromagnetic waves comprising oscillating, orthogonal electric fields, $\vec{E}$, and magnetic fields, $\vec{H}$, and a direction of propagation, $\vec{k}$. The electric and magnetic fields are related by Maxwell's equations:

$$\nabla \cdot \vec{H}(\vec{r}, t) = 0 \quad \text{Equation 1}$$

$$\nabla \cdot \varepsilon(\vec{r})\vec{E}(\vec{r}, t) = 0 \quad \text{Equation 2}$$

$$\nabla \times \vec{E}(\vec{r}, t) = -\frac{\partial \vec{H}(\vec{r}, t)}{\partial t} \quad \text{Equation 3}$$

$$\nabla \times \vec{H}(\vec{r}, t) = \varepsilon(\vec{r})\frac{\partial \vec{E}(\vec{r}, t)}{\partial t} \quad \text{Equation 4}$$

where $\vec{r}$ is spatial displacement of an electromagnetic wave in the dielectric, t is time, and $\in(\vec{r})$ is a dielectric constant.

Because dielectrics do not generally support free charges or free currents, Equations 1-4 do not include a charge density term or a volume current density term. Equations 3 and 4, the curl equations, are linear differential equations. In both equations, the left sides express the dependence of a field on the independent spatial displacement $\vec{r}$, and the right sides express the dependence of a field on t. The only way for a differential quantity that varies with respect to $\vec{r}$ to remain equal to a quantity that varies with respect to t, is for the differential quantities to equal the same constant value. Both sides of Equations 3 and 4 are equal to a constant, and the method of separation of variables can be applied to obtain:

$$\vec{H}(\vec{r},t)=\vec{H}(\vec{r})\exp(i\omega t)$$

$$\vec{E}(\vec{r},t)=\vec{E}(\vec{r})\exp(i\omega t)$$

where ω is the angular frequency of an electromagnetic wave propagating in a dielectric.

Maxwell's curl Equations 3 and 4 can be decoupled by dividing Equation 4 by the dielectric constant $\in(\vec{r})$, applying the curl operator, and substituting Equation 3 for the curl of the electric field to give:

$$\Theta\vec{H}(\vec{r}) = \omega^2 \vec{H}(\vec{r}) \quad \text{Equation 5}$$

where $\Theta = \nabla \times \left(\frac{1}{\varepsilon(r)}\nabla \times\right)$ is a differential operator.

Equation 5 is an eigenvalue equation, where the eigenvalues are $\omega^2$, and the eigenfunctions are the corresponding magnetic fields $\vec{H}(\vec{r})$. After the magnetic fields $\vec{H}(\vec{r})$ are determined according to Equation 5, the electric field $\vec{E}(\vec{r})$ can be obtained by substituting $\vec{H}(\vec{r},t)$ into Equation 3 and solving for $\vec{E}(\vec{r})$.

Figure 1A:
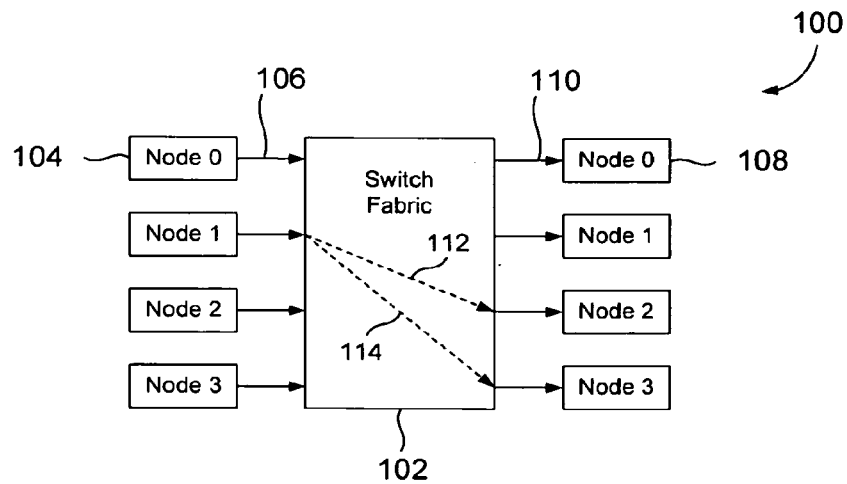
FIG. 1A illustrates a representation of a 4-node switch-fabric architecture.
Figure 1B:
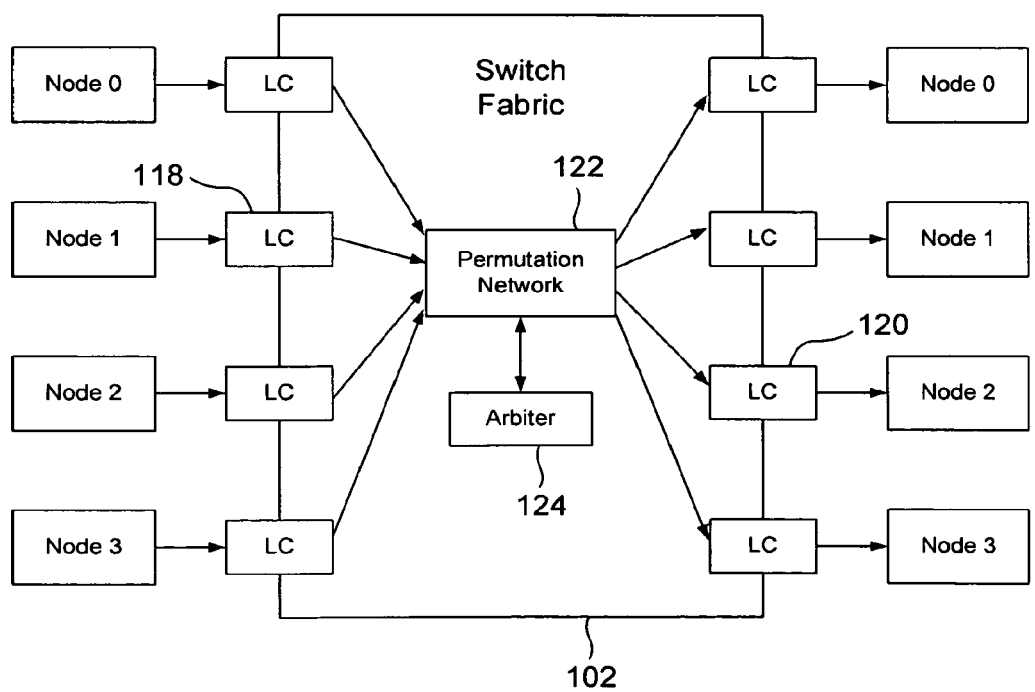
FIG. 1B illustrates an example implementation of the switch fabric shown in FIG. 1A.

For finite dimensional photonic crystals, such as the photonic crystals shown in FIGS. 1 and 2, the eigenvalues and eigenfunctions of Equations 5 are quantized to give:

$$\Theta\vec{H}_j(\vec{r})=\omega_j^2\vec{H}_j(\vec{r})$$

where j is a non-negative integer value called the "band index" that labels the harmonic modes of the magnetic field $\vec{H}(\vec{r})$ in order of increasing angular frequency.

The translational symmetry of the photonic crystal can be used to determine the functional form of the magnetic fields $\vec{H}_j(\vec{r})$. For example, the functional form of the magnetic fields $\vec{H}_j(\vec{r})$ propagating in the photonic crystal 200 are given by the following:

$$\vec{H}_{j,k_\parallel,k_z}(\vec{r})=\exp(i\vec{k}_\parallel\cdot\vec{\rho})\exp(i\vec{k}_z z)\vec{u}_{j,k_\parallel,k_z}(z) \quad \text{Equation 6:}$$

where $\vec{\rho}$ is an xy-plane vector, $\vec{k}_\parallel$ is an xy-plane wave vector, $k_z$ is a z-direction wave vector component, and $\vec{u}_{n,k_\parallel,k_z}(Z)$ is a periodic function in the z-direction. The exponential term $\exp(i\vec{k}_\parallel\cdot\vec{\rho})$ in Equation 6 arises from the continuous translational symmetry of ER propagating through the dielectric layers in the xy-plane. However, the term $\exp(ik_z z)\vec{u}_{j,k_\parallel,k_z}(z)$ in Equation 6 arises from Bloch's theorem and the discrete translational symmetry imposed in the z-direction by the periodicity of the dielectric constant of the photonic crystal 200, given by:

$$\in(\vec{r})=(\vec{r}+\vec{R})$$

where $\vec{R}=al\hat{z}$, a is a lattice constant determined by the regular pattern of the dielectric layers, and I is an integer.

The magnetic fields $\vec{H}_{j,k_\parallel,k_z}(\vec{r})$ are periodic for integral multiples of $2\pi/a$. As a result, the associated angular frequencies are also periodic:

$$\omega_j(k_z) = \omega_j\left(k_z + \frac{m2\pi}{a}\right) \quad \text{Equation 7}$$

Differences in the dielectric pattern of a photonic crystal creates one or more range of frequencies $\omega_j$, referred to as "photonic bandgaps," for which ER is prevented from propagating in the photonic crystal. The photonic bandgap also corresponds to an electromagnetic energy range and a range of wavelengths, denoted by $\lambda_j$, for which the differences between the dielectrics prevents ER absorption and ER propagation. The wavelength $\lambda_j$ of ER transmitted through a photonic crystal is related to the angular frequency $\omega_j$:

$$\lambda_j = \frac{2\pi v}{\omega_j}$$

where v is the velocity of ER in the photonic crystal. Certain ER frequency ranges are not transmitted through a photonic crystal because high-frequency harmonic modes tend to concentrate electromagnetic energy in dielectric regions with a low dielectric constant, while low-frequency harmonic modes tend to concentrate electromagnetic energy in dielectric regions with a high dielectric constant. The electromagnetic energy, W, can be determined from the variational principle as follows:

$$W(\vec{H}) = \frac{1}{2(\vec{H},\vec{H})} \int d\vec{r} \frac{1}{\varepsilon(\vec{r})} |\nabla \times \vec{H}(\vec{r})|^2$$

where $(\vec{H},\vec{H}) = \int d\vec{r}\, \vec{H}(\vec{r})^* \vec{H}(\vec{r})$, and "*" represents the complex conjugate.

The electromagnetic energy is lower for harmonic modes propagating in regions with a high dielectric constant than for modes propagating in regions of a photonic crystal with a low dielectric constant.

The size of and range of frequencies within a photonic bandgap of a one-dimensional photonic crystal depends on the relative difference between the dielectric constants of the dielectrics comprising a photonic crystal. One-dimensional photonic crystals with large relative differences between the dielectric constants of the materials comprising the photonic crystal have larger photonic bandgaps at higher frequency ranges than photonic crystals with smaller relative differences between the dielectric constants.

Figure 4A:
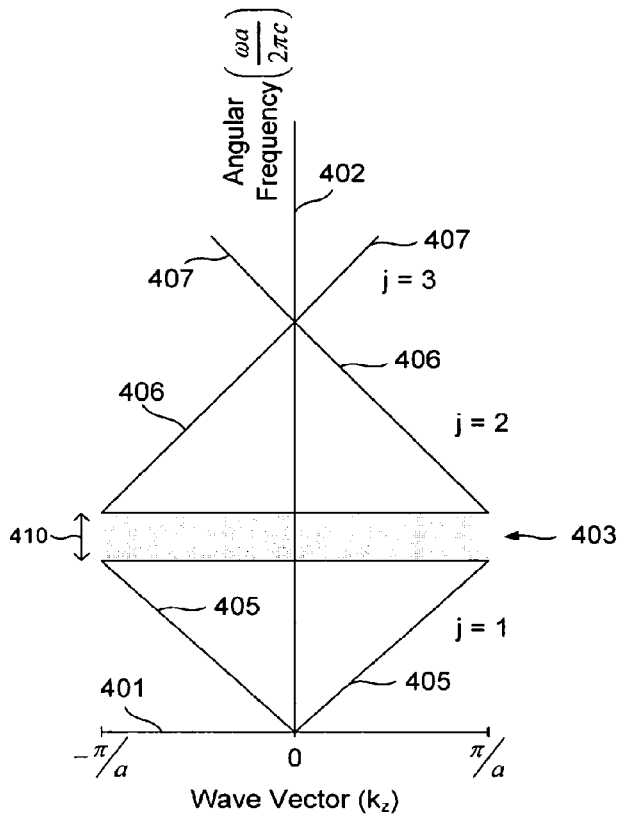
FIGS. 4A-4B are hypothetical plots of frequency versus wave vector z-component for a first one-dimensional photonic crystal and a second one-dimensional photonic crystal, respectively.
Figure 4B:
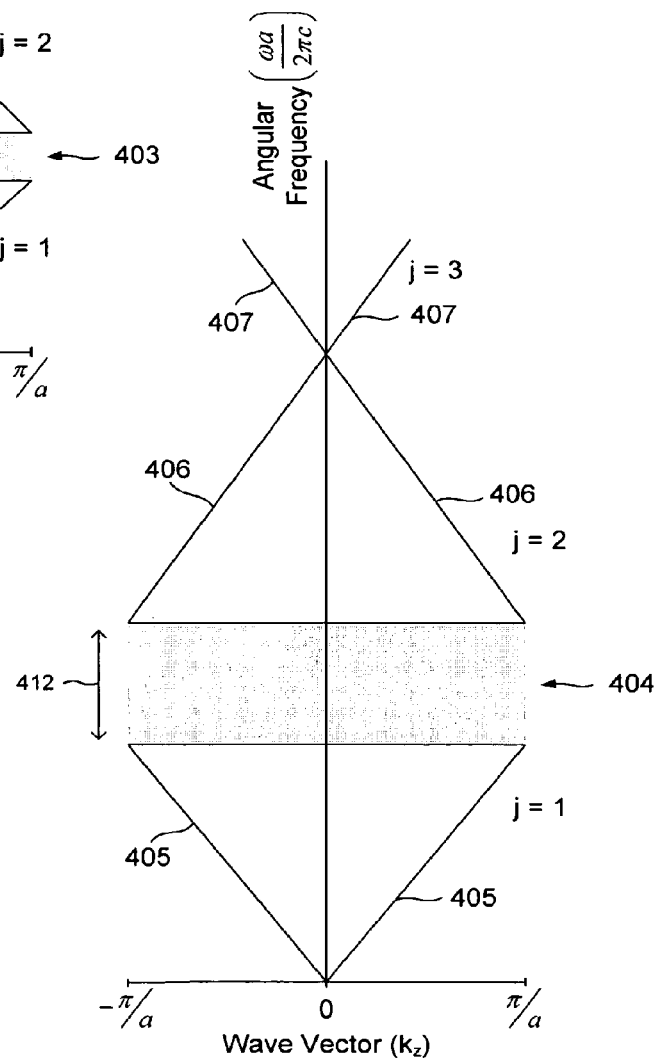

FIGS. 4A-4B are hypothetical plots of frequency ($\omega\alpha/2\pi c$) versus wave vector z-component, $k_z$, for a first one-dimensional photonic crystal and a second one-dimensional photonic crystal, respectively. In FIGS. 4A-4B, horizontal axes, such as horizontal axis 401, correspond to wave vector z-component $k_z$, and vertical axes, such as vertical axis 402, correspond to the frequency. Because the frequencies $\omega_j$ are periodic, as described above with reference to Equation 7, frequencies ($\omega j\alpha/2\pi c$) are plotted with respect to wave vector z-component range $-\pi/\alpha$ and $\pi/\alpha$ for angular frequency bands j equal to 1, 2, and 3. The photonic bandgaps are identified by shaded regions 403 and 404. Lines 405, 406, and 407 correspond to the first, second, and third angular frequency bands (j=1, 2, and 3). The width 410 of the photonic bandgap 403, in FIG. 4A, is smaller than the width 412 of the photonic bandgap 404, in FIG. 4B, because the relative difference between the dielectric constants of the materials comprising the first photonic crystal is smaller than the relative difference between the dielectric constants of materials comprising the second photonic crystal. Also, the photonic bandgap 403 covers a lower range of frequencies than the range of frequencies covered by photonic bandgap 404.

Figure 5:
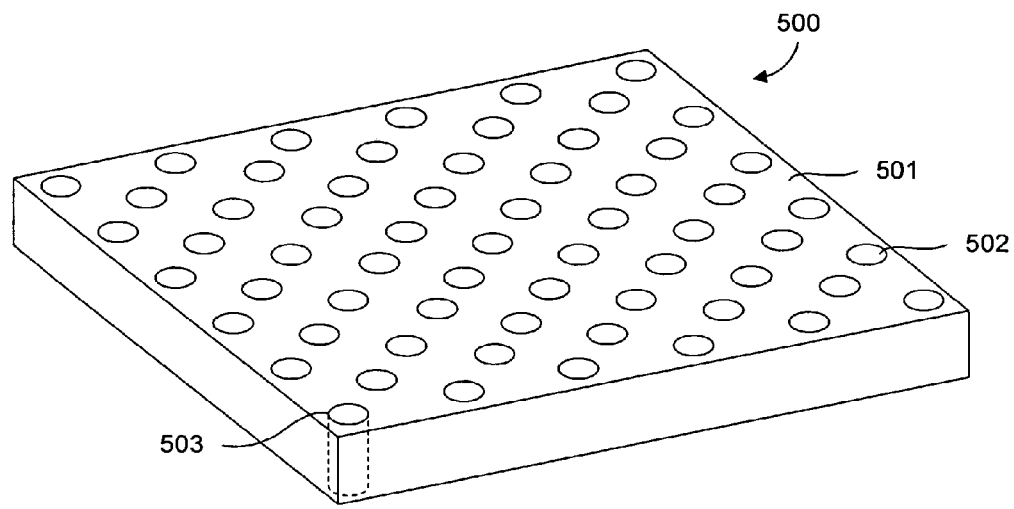
FIGS. 5-6 illustrate perspective views of two two-dimensional photonic crystals.
Figure 6:
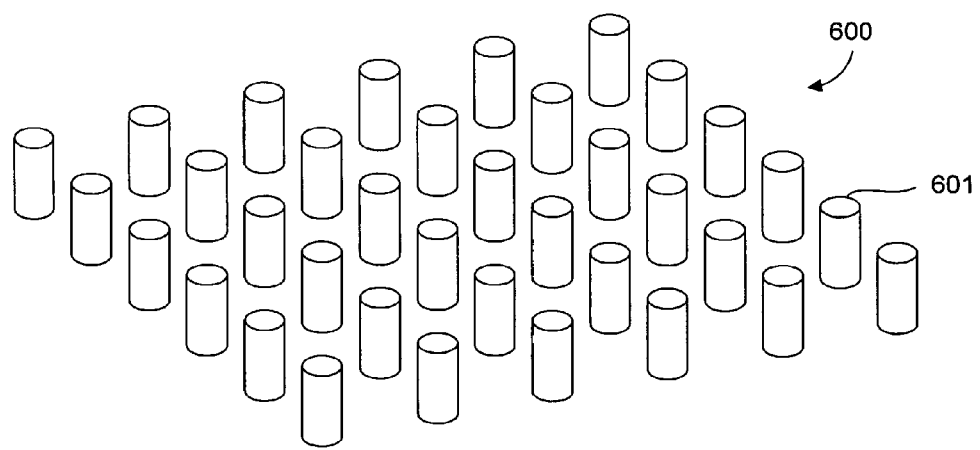

Two-dimensional photonic crystals can be composed of a regular lattice of cylindrical columns fabricated in a dielectric slab. The cylindrical columns can be air holes or holes filled with a dielectric material different from the dielectric material of the photonic slab. FIG. 5 illustrates a perspective view of a two-dimensional photonic crystal. In FIG. 5, a photonic crystal 500 is composed of a dielectric slab 501 with a regular lattice of embedded cylindrical columns, such as column 502. The cylindrical columns extend from the top surface to the bottom surface of the slab 501, as indicated by a cylindrical column 503, and can be holes filled with air or any other material having a dielectric constant different from the dielectric constant of the slab 501. Two-dimensional photonic crystals can also be composed of a regular lattice arrangement of cylindrical columns surrounded by a gas or a liquid. FIG. 6 illustrates a two-dimensional photonic crystal 600 having a regular square lattice of solid cylindrical columns, such as a cylindrical column 601, surrounded by fluid, such as gas or liquid, with a dielectric constant different from the cylindrical columns.

Figure 7A:
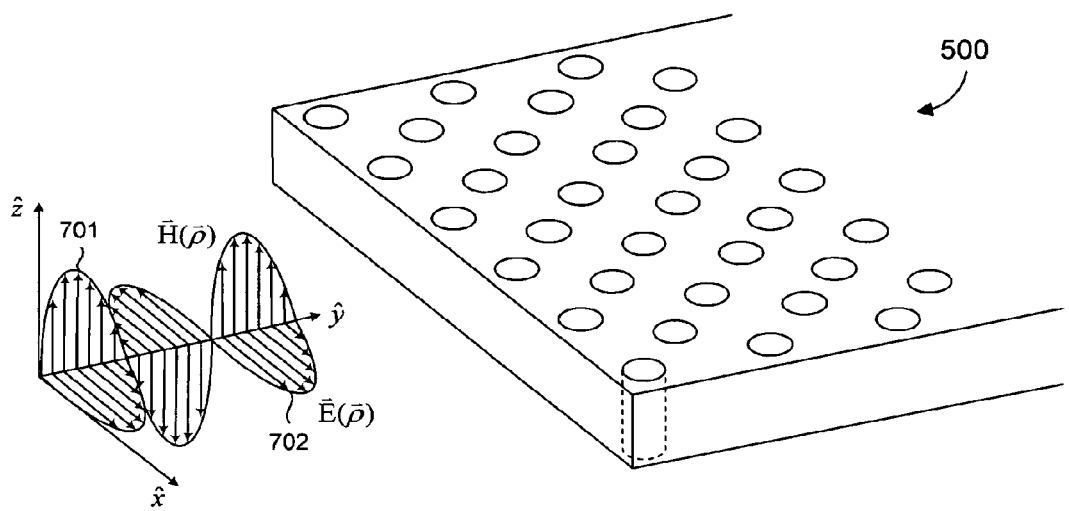
FIGS. 7A-7B illustrate propagation of a transverse electric field and magnetic field modes in the two-dimensional photonic crystal shown in FIG. 5.
Figure 7B:
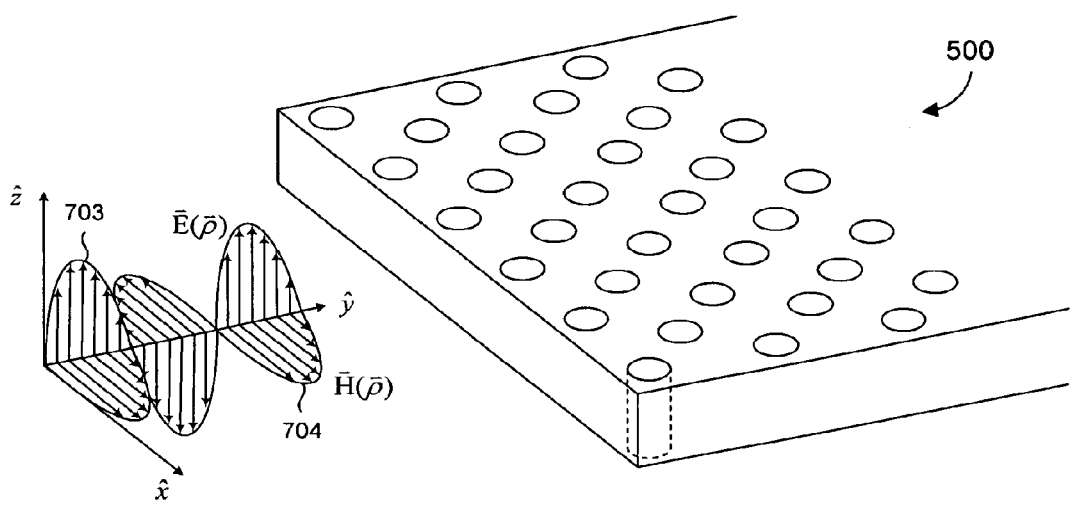

Two-dimensional photonic crystals polarize ER propagating in the periodic plane of the photonic crystal, and the electric and magnetic fields can be classified into two distinct polarizations: (1) the transverse electric-field ("TE") modes; and (2) the transverse magnetic-field ("TM") modes. The TE have $\vec{H}(\vec{\rho})$ directed normal to the periodic plane of the photonic crystal and $\vec{E}(\vec{\rho})$ directed in the periodic plane of the photonic crystal, while the TM have $\vec{E}(\vec{\rho})$ directed normal to the periodic plane of the photonic crystal and $\vec{H}(\vec{\rho})$ directed in the periodic plane of the photonic crystal. FIGS. 7A-7B illustrate propagation of TE and TM modes in the two-dimensional photonic crystal shown in FIG. 5. The periodic plane of the photonic crystal 500 lies in the xy-plane, the cylindrical columns are parallel to the z-direction, and ER propagates through the photonic crystal 500 in the y-direction. In FIG. 7A, an oscillating curve 701 represents the $\vec{H}(\vec{\rho})$ mode directed normal to the xy-plane, and an oscillating curve 702 represents the orthogonal $\vec{E}(\vec{\rho})$ mode directed in the xy-plane. In FIG. 7B, an oscillating curve 703 represents the $\vec{E}(\vec{\rho})$ mode directed normal to the xy-plane, and an oscillating curve 704 represents the orthogonal $\vec{H}(\vec{\rho})$ mode directed in the xy-plane.

Figure 8:
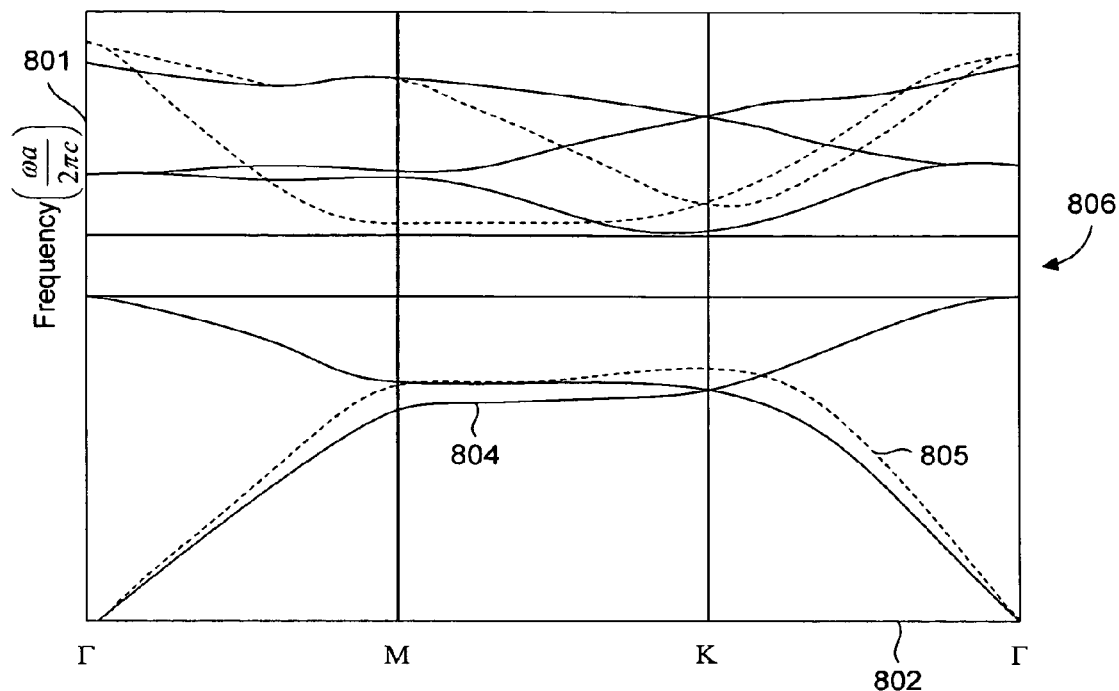
FIG. 8 illustrates a photonic band structure of transverse electric field and magnetic field modes propagating in the two-dimensional photonic crystal shown in FIG. 5.

FIG. 8 illustrates a photonic band structure of TM and TE modes of an ER propagating in the photonic crystal shown in FIG. 5. In FIG. 8, a vertical axis 801 represents the angular frequency of ER propagating in the photonic crystal 500, and a horizontal axis 802 represents the ER propagation paths between lattice points labeled Γ, M, and K in a photonic crystal segment 803 of the photonic crystal 500, shown in FIG. 5. Solid lines, such as solid line 804, represent TM modes, and dashed lines, such as dashed line 805, represent the TE modes. A shaded region 806 identifies a photonic bandgap in which neither the TE nor TM modes are permitted to propagate in the photonic crystal 500.

The width and the frequency range covered by photonic bandgaps in two-dimensional photonic crystal slabs, such as the photonic bandgap 806, depends on the periodic spacing of the cylindrical columns, represented by lattice constant a, and the relative difference between the dielectric constant of the slab and the dielectric constant of the cylindrical columns. Also, the frequency range covered by photonic bandgap 806 can be shifted to a higher frequency range for larger relative differences between the dielectric constant of the slab and the dielectric constant of the cylindrical columns, while the photonic bandgap 806 can be shifted to a lower frequency range for smaller relative differences between the dielectric constant of the slab and the dielectric constant of the cylindrical columns.

Electron beam or nanoimprint lithography followed by chemical etching, or other processing methods, can be used to fabricate cylindrical columns in a suitable two-dimensional dielectric slab. In addition, two-dimensional photonic crystals can be designed to reflect ER within a specified frequency band. As a result, a two-dimensional photonic crystal can be designed and fabricated as a frequency-band stop filter to prevent the propagation of ER having frequencies within the photonic bandgap of the photonic crystal. Generally, the size and relative spacing of cylindrical columns control which wavelengths of ER are prohibited from propagating in the two-dimensional photonic crystal. However, defects can be introduced into the lattice of cylindrical columns to produce particular localized optical components. In particular, a point defect, referred to as a "resonant cavity," can be fabricated to provide a resonator that temporarily traps a narrow range of frequencies or wavelengths of ER. A line defect, referred to as a "waveguide," can be fabricated to transmit ER with frequency ranges or wavelengths that lie within a frequency range of a photonic bandgap. As a result, a three-dimensional photonic crystal slab can be thought of as two-dimensional crystal having a refractive index n that depends on the thickness of the slab.

Figure 9:
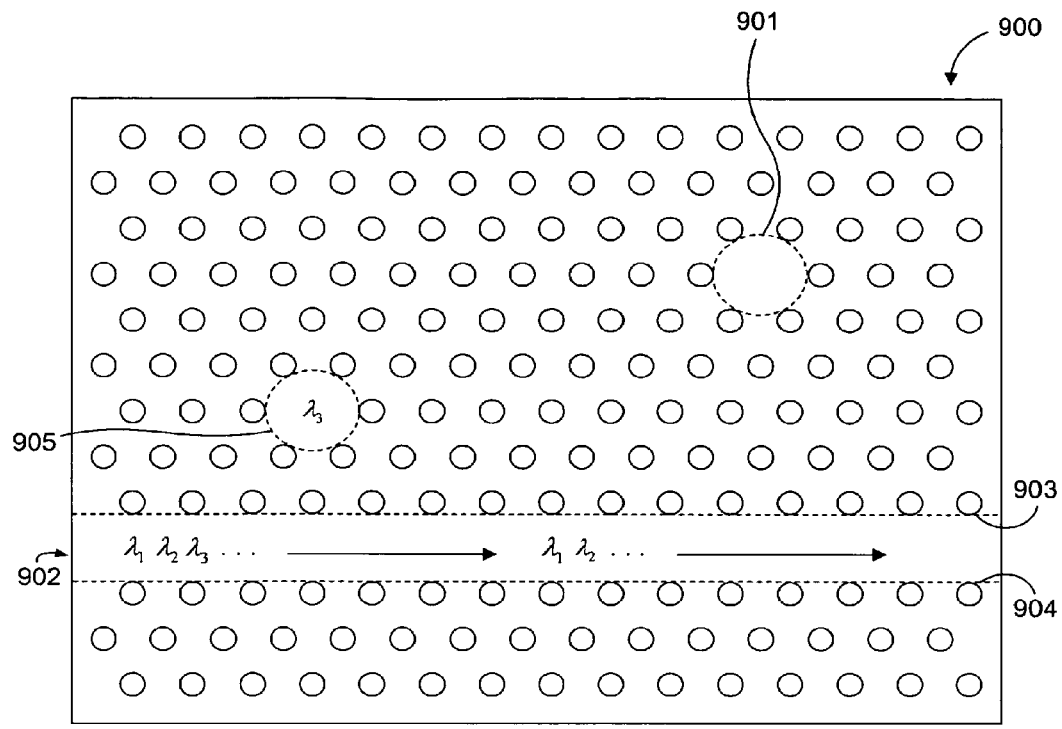
FIG. 9 illustrates an example of a photonic crystal with two resonant cavities and a waveguide.

FIG. 9 illustrates an example of a photonic crystal with two resonant cavities and a waveguide. A resonant cavity can be created in a two-dimensional photonic crystal slab by omitting, increasing, or decreasing the size of a select cylindrical column. For example, a resonant cavity 901 is created in a photonic crystal 900 by omitting a cylindrical column, as indicated by the empty region surrounded by a dashed-line circle. Resonant cavities 901 and 905 are surrounded by effectively reflecting walls that temporarily trap ER in the frequency range of the photonic bandgap. Resonant cavities can channel ER within a narrow frequency band in a direction perpendicular to the plane of the photonic crystal. For example, the resonant cavity 901 can trap localized TM modes and TE modes within a narrow frequency band of the photonic bandgap. Unless the photonic crystal 900 is sandwiched between two reflective plates or dielectrics that create total internal reflection, the ER resonating in the resonant cavity 901 can escape in the direction perpendicular to the periodic plane of the photonic crystal 900. Each resonant cavity has an associated quality ("Q") factor that provides a measure of how many oscillations take place in a cavity before the ER resonating in the resonant cavity diffuse into the region surrounding the resonant cavity.

Waveguides are optical transmission paths that can be used to direct ER within a particular frequency range of the photonic bandgap from a first location in a photonic crystal to a second location in the photonic crystal. Waveguides can be fabricated by changing the diameter of certain cylindrical columns within a column or row of cylindrical columns, or by omitting rows of cylindrical columns. For example, in the photonic crystal 900, a dielectric waveguide 902 is created by omitting an entire row of cylindrical columns during fabrication of the photonic crystal 900, as indicated by the empty region between dashed lines 903 and 904. The dielectric waveguide 902 transmits ER with wavelengths $\lambda_0$ and $\lambda_1$ along a single path. Networks of branching waveguides can be used to direct ER in numerous different pathways through the photonic crystal. The diameter of an optical signal propagating along a waveguide can be as small as $\Box/3n$, where n is the refractive index of the waveguide, while a harmonic mode volume of a resonant cavity can be as small as 2 $(\Box/3n)^3$.

Waveguides and resonant cavities may be less than 100% effective in preventing ER from escaping into the area immediately surrounding the waveguides and resonant cavities. For example, ER within a frequency range in the photonic bandgap propagating along a waveguide also tends to diffuse into the region surrounding the waveguide. ER entering the area surrounding a waveguide or a resonant cavity experiences an exponential decay in amplitude, a process referred to as "evanescence." As a result, a resonant cavity can be located within a short distance of a waveguide to allow certain wavelengths of ER carried by the waveguide to be extracted by the resonant cavity. In effect, resonant cavities are filters that can be used to extract a fraction of a certain wavelength of ER propagating in the waveguide. Depending on a resonant cavity Q factor, an extracted ER can remain trapped in a resonant cavity and resonate for a time before evanescing into the surroundings or backscattering into the waveguide. For example, in FIG. 9, the resonant cavity 901 is located too far from the waveguide 902 to extract a mode with particular wavelength of ER. However, the resonant cavity 905 is able to extract a fraction of ER with wavelength $\lambda_3$ propagating along the waveguide 902. Thus, a smaller fraction of ER with wavelength $\lambda_3$ may be left to propagate in the waveguide 902 along with ER of wavelengths $\lambda_1$ and $\lambda_2$.

Figure 10:
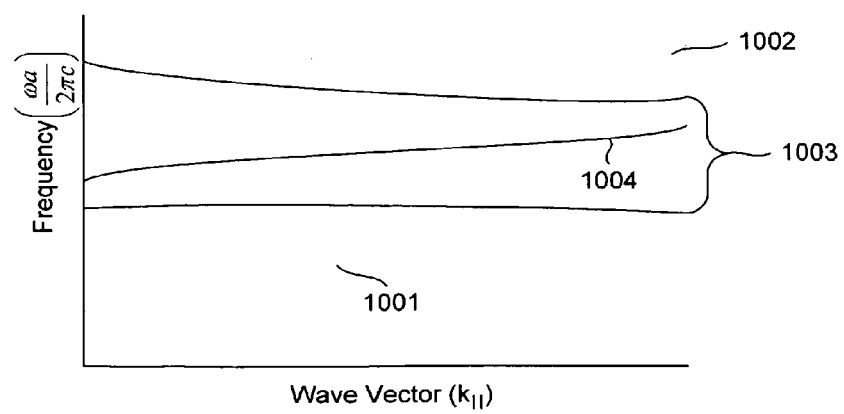
FIG. 10 is a hypothetical plot of frequency versus the magnitude of wave vector for the waveguide of the photonic crystal shown in FIG. 9.

FIG. 10 is a hypothetical plot of frequency versus the magnitude of wave vector $\vec{k}_\parallel$ for the waveguide of the photonic crystal shown in FIG. 9. In FIG. 10, shaded regions 1001 and 1002 represent projected first and second band structures of the photonic crystal 900 in the absence of the waveguide 902, shown in FIG. 9. A region 1003 identifies the photonic bandgap created by the photonic crystal 900. Line 1004 identifies a band of frequencies permitted to propagate in the waveguide 902. The number of frequency bands permitted to propagate in waveguide 902 can be increased by increasing the size of the waveguide 902.

For three-dimensional photonic crystals, the three-dimensional lattice parameters, the difference between dielectric constants, and the dimensions of the inclusions determine the frequency range of photonic bandgaps. Waveguides and resonant cavities can also be fabricated in three-dimensional photonic crystals by selectively removing or changing the dimensions of certain inclusions.

An Overview of Encoding Data in Electromagnetic Radiation

Figure 11A:
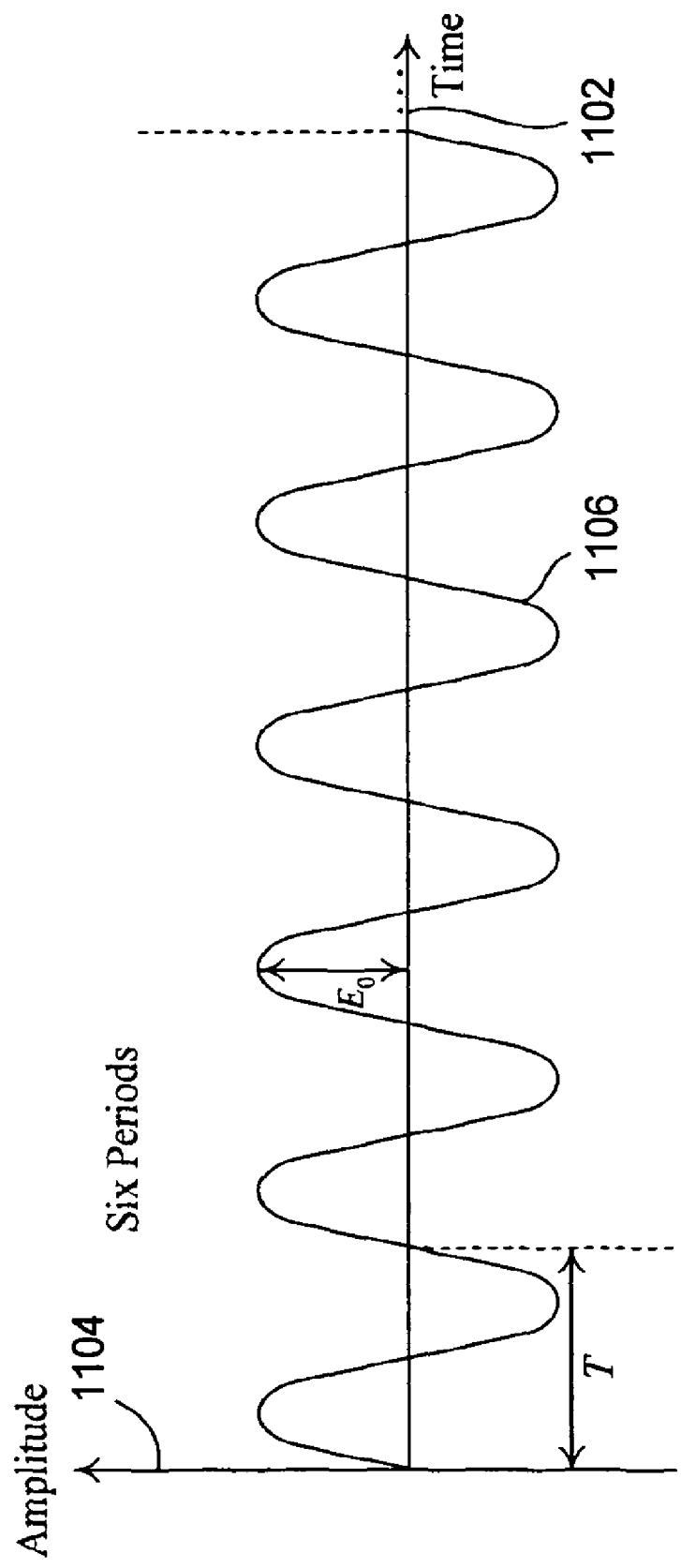
FIGS. 11A-11E illustrate examples of information encoded in electromagnetic signals.

A bit is a basic unit of information in computational systems and is equivalent to a choice between two alternatives, such as "yes" and "no," or "on" and "off." The two states for a bit are typically represented by the numbers 1 or 0. Information can be encoded in an electromagnetic wave by modulating the electromagnetic wave amplitude frequency, or phase. The modulated electromagnetic waves can then be transmitted over large distance in optical fibers, waveguides, or through free space, and decoded by a demodulator. However, most electromagnetic wave interactions with matter result from the electric field component rather than the magnetic field component, because the amplitude of the magnetic field is smaller than the amplitude of the electric field by the factor 1/c, where c represents the speed of light. As a result, and for the sake of simplicity, an electromagnetic wave can be represented by the electric field component:

$$E(z,t)=E_0 \cos(zk-\omega t)$$

where the electric field propagates in the z direction, $\omega$ is angular frequency, k is a wavevector $\omega/c$, t is time, and $E_0$ is the amplitude. FIG. 11A is a plot of an electromagnetic wave as a function of time and a fixed observation point. In FIG. 11A, horizontal line 1102 is a time axis, vertical line 1104 is the amplitude $E_0$, and curve 1106 represents the electric field E(z,t). The period T is the time it takes for the electromagnetic signal to complete a cycle. The angular frequency $\omega$ is $2\pi\upsilon$, where $\upsilon$ is the frequency, or number of times, the electromagnetic field completes a cycle per unit of time.

Figure 11B:
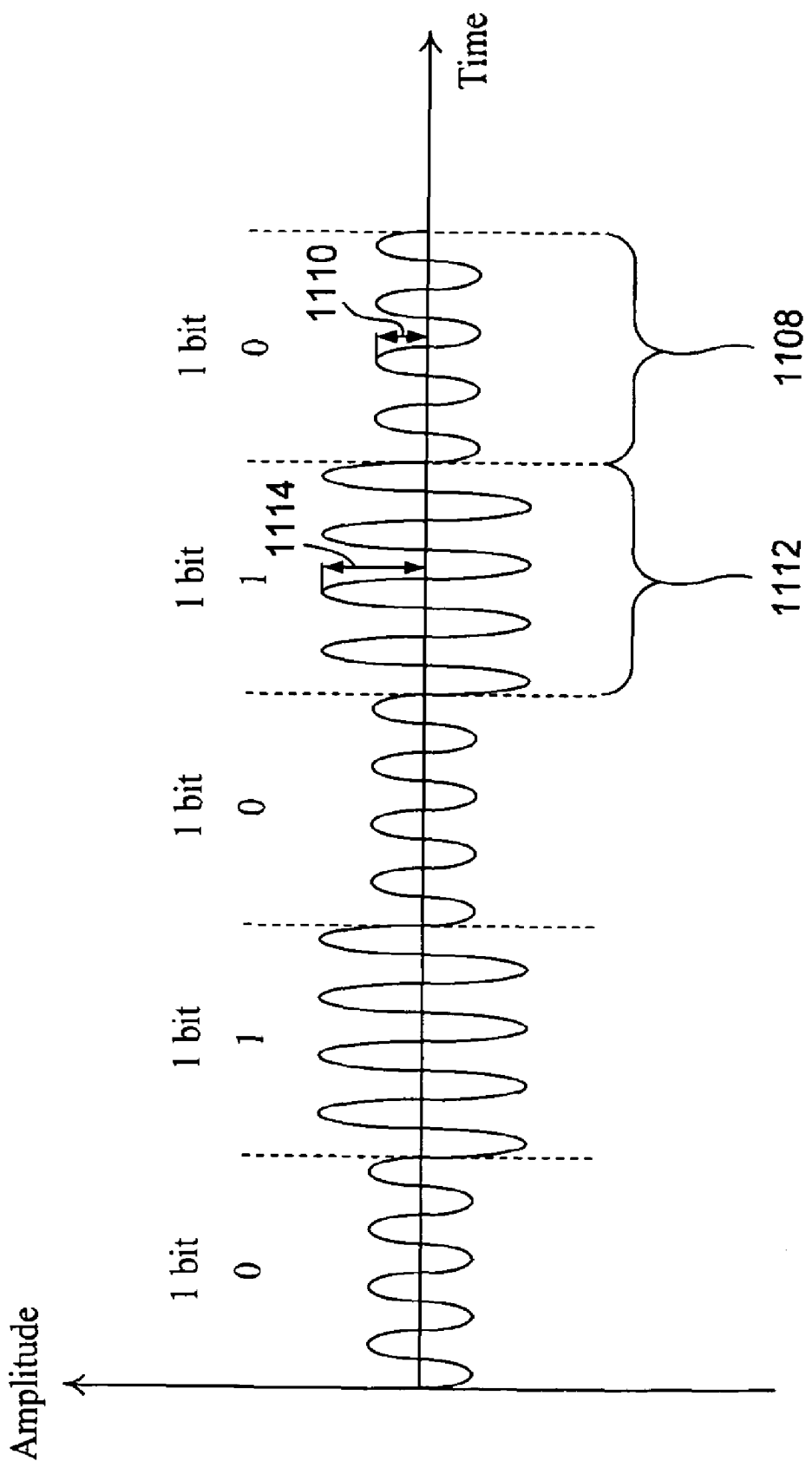
Figure 11C:
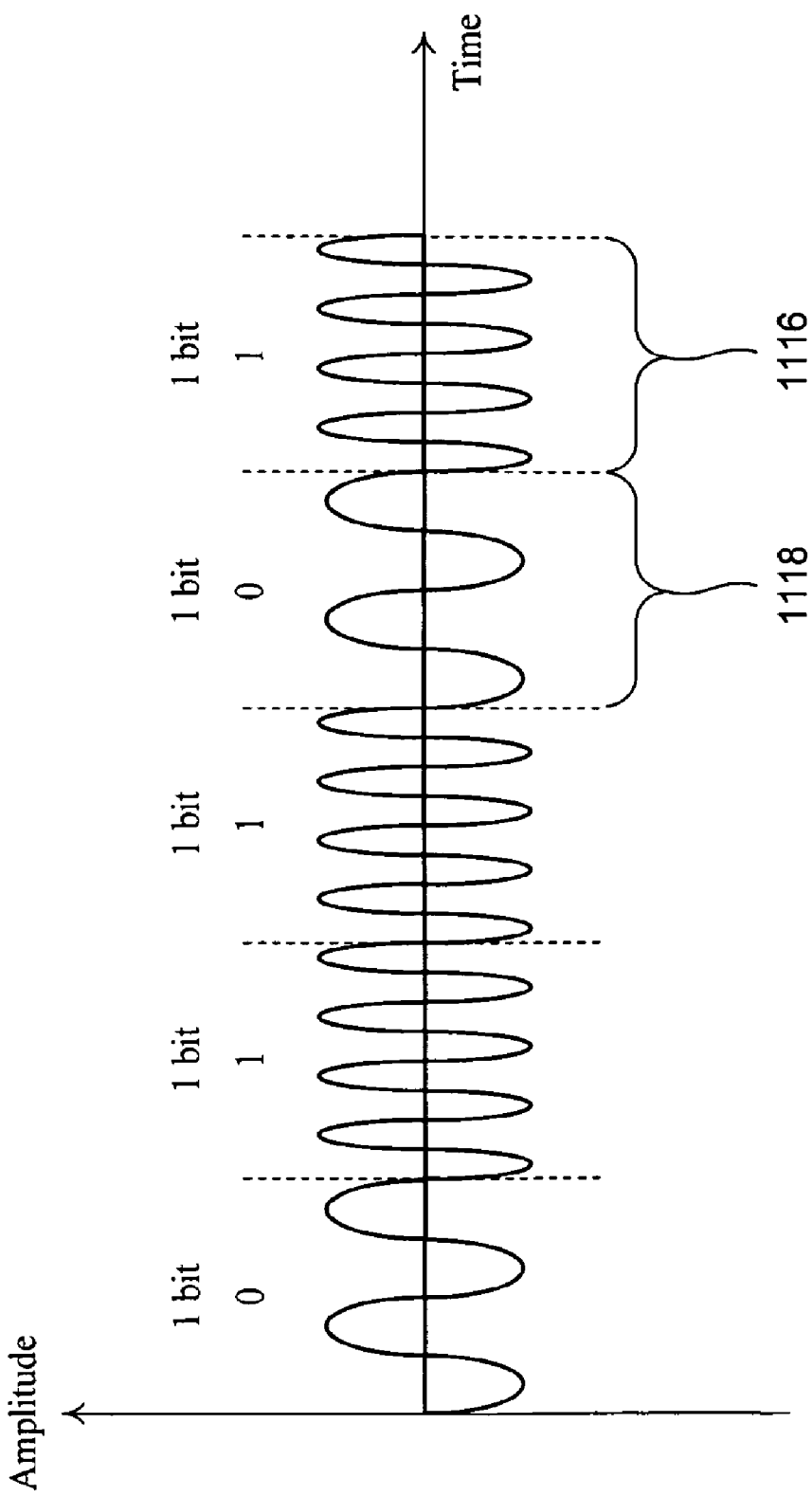

Amplitude modulation is used to encode information by changing the strength or magnitude of the amplitude of the electromagnetic signal. FIG. 11B illustrates an example of an amplitude modulated electromagnetic signal encoding of the bits "0" and "1." In FIG. 11B, a bit corresponds to four consecutive cycles of the signal, where the cycles 1108 with a small amplitude 1110 corresponds to the bit "0," and the cycles 1112 with a relatively large amplitude 1114 corresponds to the bit "1." Frequency modulation is used to encode information by varying the frequency of the electromagnetic signal. FIG. 11C illustrates an example of a frequency modulated electromagnetic signal encoding of the bits "0" and "1."

Figure 11D:
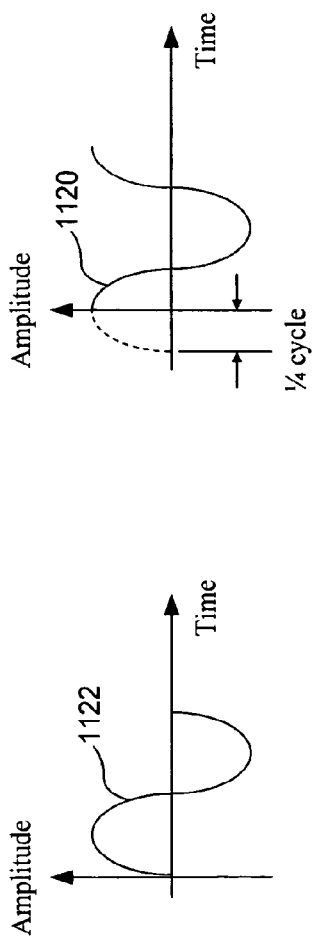
Figure 11E:
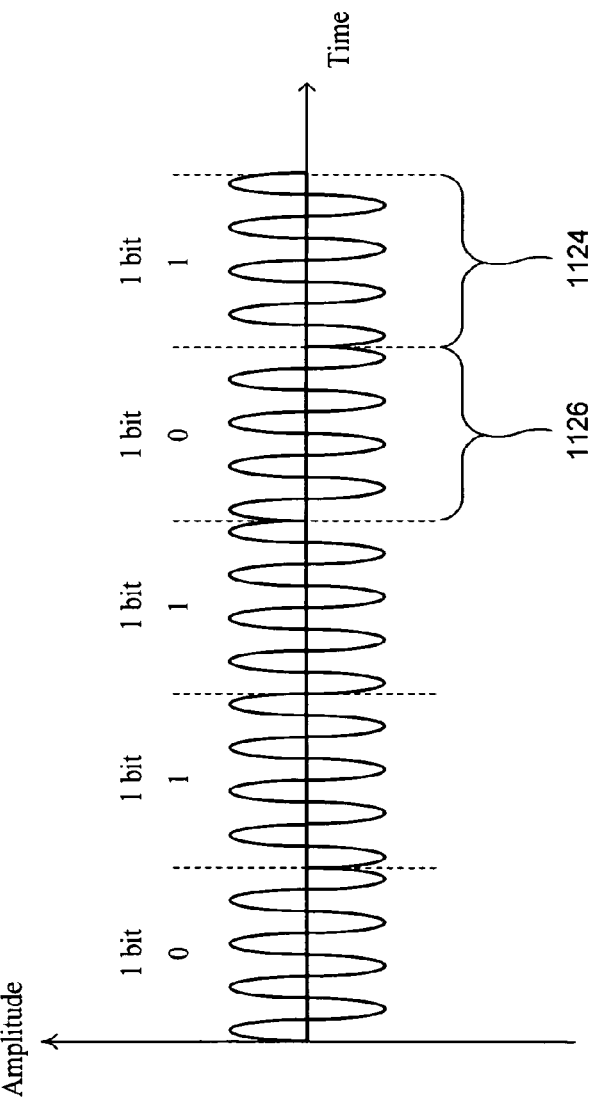

In FIG. 11C, the four consecutive cycles 1116 correspond to the bit "1," and the two consecutive cycles 1118 corresponds to the bit "0." Phase modulation is used to encode information by shifting the phase of the electromagnetic signal as follows:

$$E(z,t)=E_0 \cos(zk-\omega t+\phi)$$

where $\phi$ represents a phase shift. A phase shift corresponds to a shift in the waveform of the electromagnetic signal. For example, FIG. 11D illustrates a curve 1120 that includes a ¼ cycle phase shift of a curve 1122. FIG. 11E illustrates an example of a phase modulated electromagnetic signal encoding of the bits "0" and "1." In FIG. 11E, the cycles 1124 corresponds to a bit "1," and the cycles 1126 includes a ½ cycle phase shift that corresponds to the bit "0."

EMBODIMENTS OF THE PRESENT INVENTION

Figure 12:
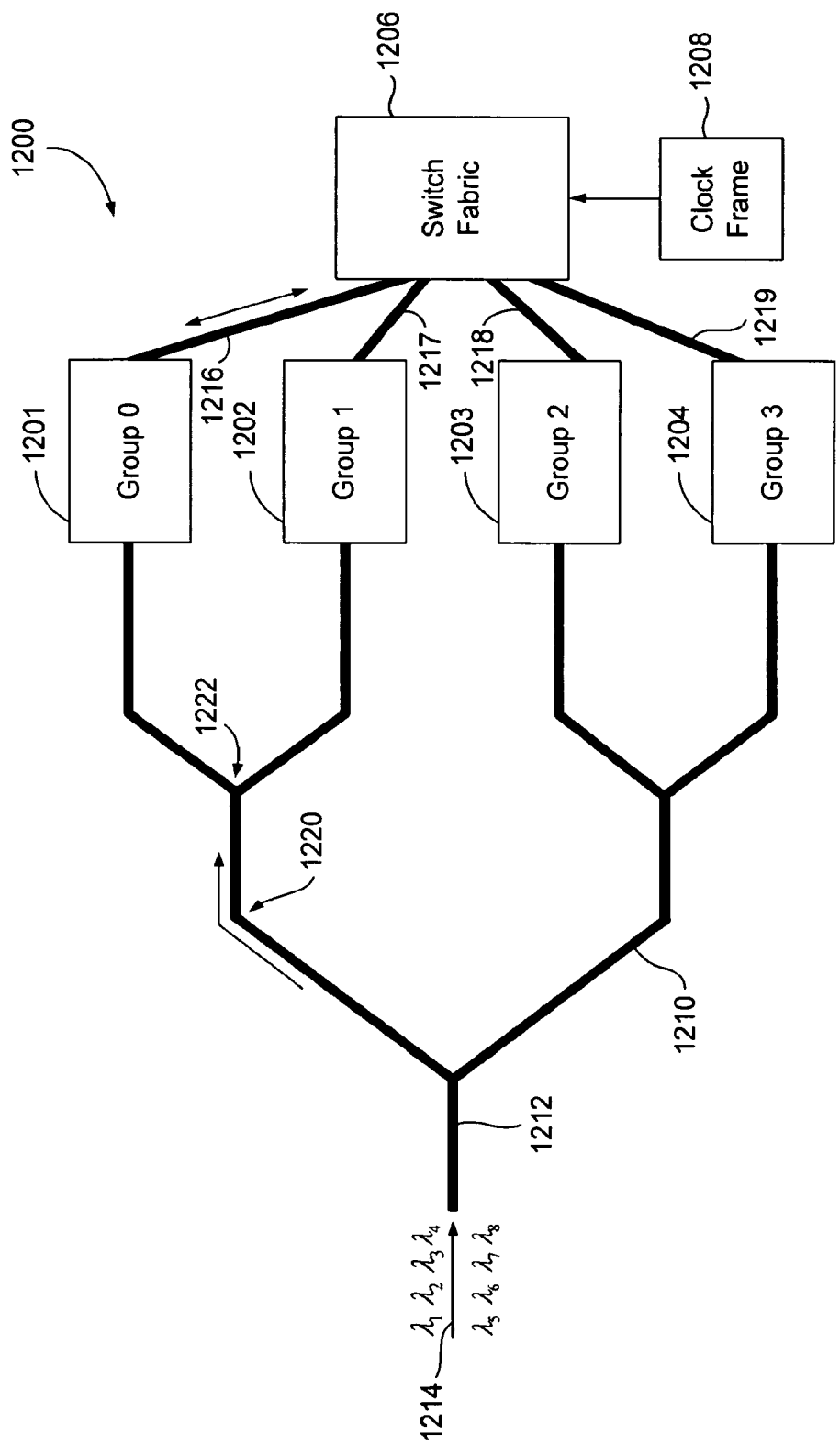
FIG. 12 illustrates a photonic-interconnection-based compute cluster that represents one of many embodiments of the present invention.

FIG. 12 illustrates a photonic-interconnection-based compute cluster that represents one of many embodiments of the present invention. Compute cluster 1200 is composed of groups 1201-1204, a switch fabric 1206, a clock frame 1208, and a tree of branching optical transmission paths represented by branching lines, such as line 1210. The groups 1201-1204 are each composed of one or more nodes described below with reference to FIG. 14. In FIG. 12, an optical signal source (not shown) generates an optical signal comprising eight independent electromagnetic waves called "frequency channels," each frequency channel having a different wavelength that are represented by $\lambda_1, \lambda_2, \lambda_3, \lambda_4, \lambda_5, \lambda_6, \lambda_7$, and $\lambda_8$. The optical signal enters the compute cluster 1200 in an optical transmission path 1212 in the direction identified by the direction arrow 1214. The optical transmission path 1212 leads to other branching optical transmission paths that transmit all eight of the frequency channels to the groups 1201-1204. A number of the frequency channels can then be encoded with data by the nodes of each group and redistributed to different nodes by the switch fabric 1206. The clock frame 1208 provides a clock signal that can be used to synchronize operation of the components comprising the compute cluster 1200.

Figure 13A:
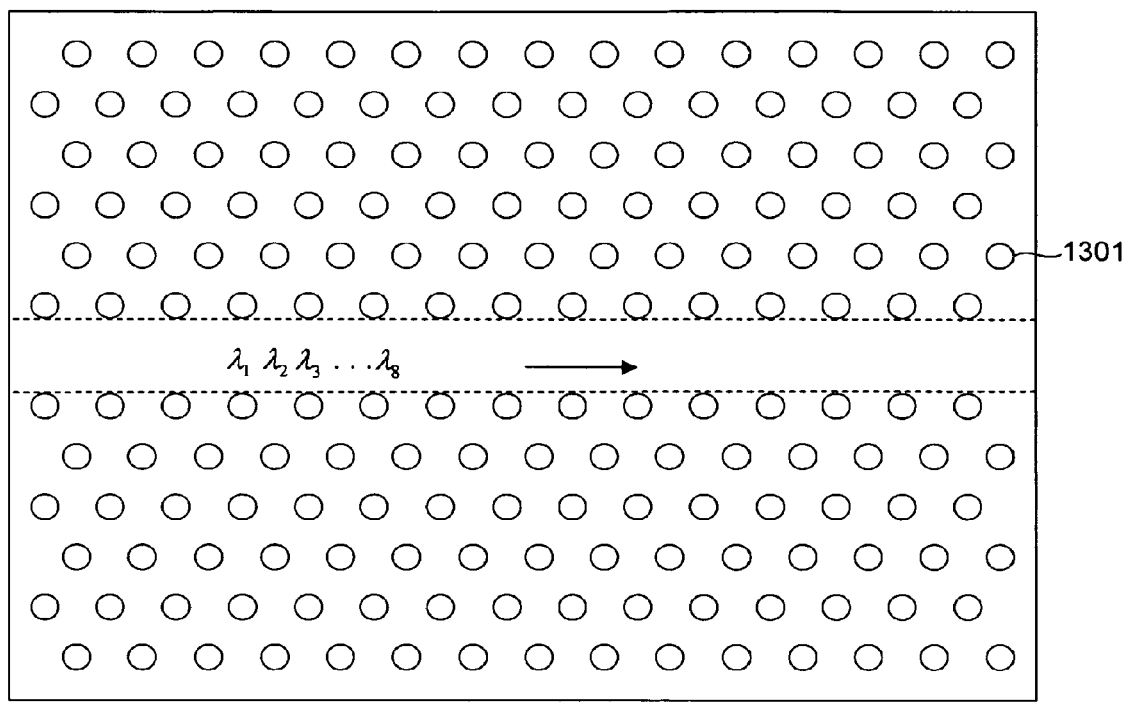
FIGS. 13A-13C illustrate examples of waveguides in a photonic crystal that can be used to transmit and distribute an optical signal to each group of nodes in a compute cluster, each representing one of many embodiments of the present invention.
Figure 13B:
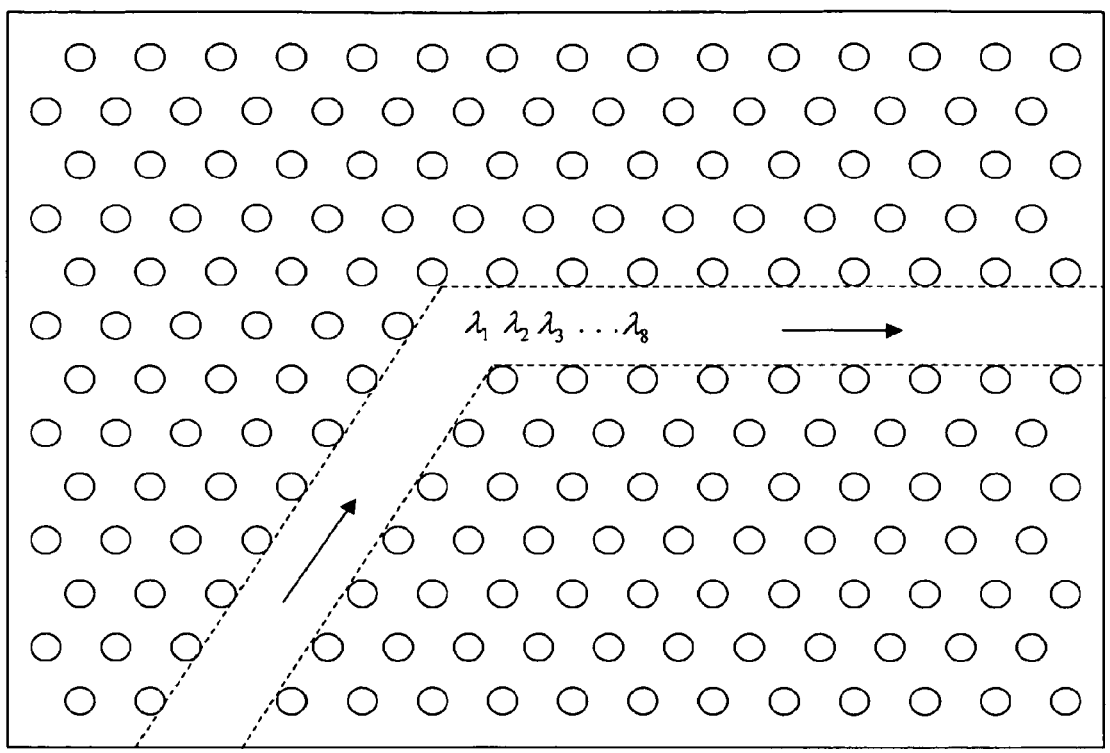
Figure 13C:
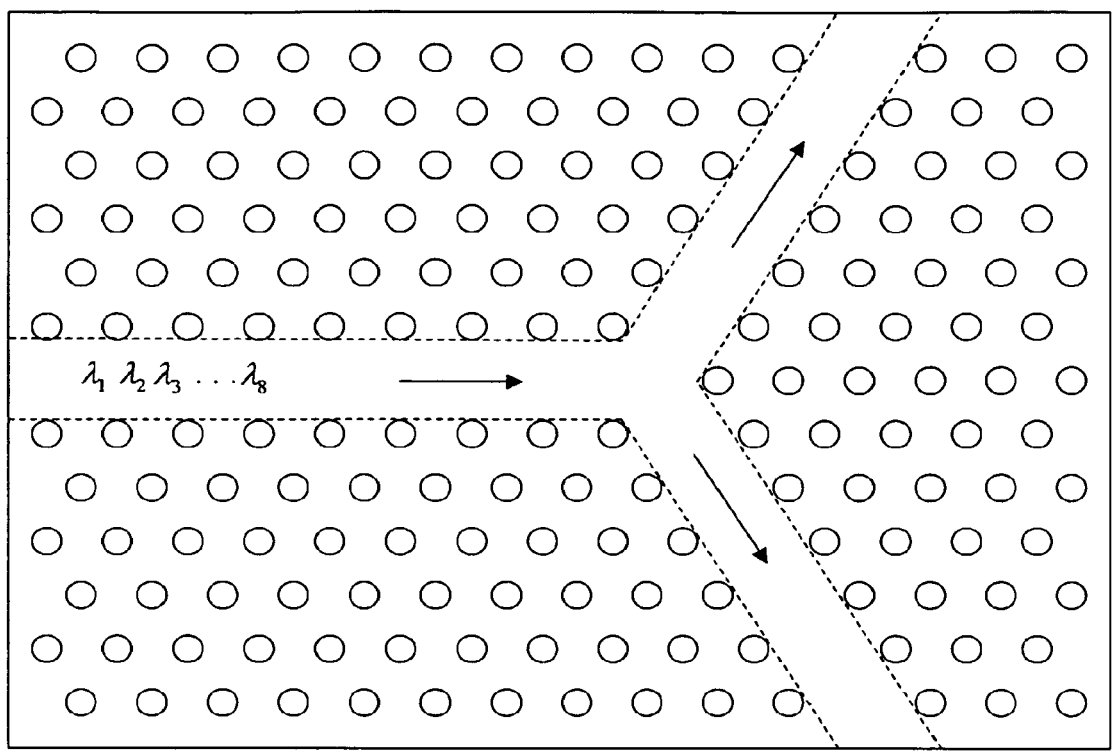

The optical transmission paths can be optical fibers, coaxial cables, waveguides in a photonic crystal, or any combination of optical fibers, coaxial cables, and waveguides. A single optical transmission path can transmit numerous independent frequency channels, each frequency channel representing an independent bus. FIGS. 13A-13C illustrate examples of waveguides in a two-dimensional, photonic-crystal-based interconnection that can be used to transmit and distribute an optical signal to each group of a compute cluster that represents one of many embodiments of the present invention. In FIGS. 13A-13C, waveguides are located within a lattice of cylindrical columns, such as cylindrical column 1301 shown in FIG. 13A. The cylindrical columns can be air holes or holes filled with a dielectric material different from the dielectric material of the photonic crystal slab. Two-dimensional photonic interconnections may have cylindrical column diameters and lattice constants on the order of a few hundred nanometers or less. The diameter and pattern of cylindrical columns, and the dielectric material in or surrounding cylindrical columns, can be selected to create photonic bandgaps that effectively confine the optical signal to the waveguides. FIG. 13A illustrates a straight-line waveguide that can be used to transmit the optical signal comprising frequency channels $\lambda_1, \lambda_2, \lambda_3, \lambda_4, \lambda_5, \lambda_6, \lambda_7$, and $\lambda_8$ along a straight path, such as the optical transmission path 1212 in FIG. 12. FIG. 13B illustrates a bent waveguide that can be used to confine and direct the path of the optical signal, such as bent optical transmission path 1220 in FIG. 12. FIG. 13C illustrates a Y-shaped waveguide that can be used to transmit the same optical signal into two different waveguides, such as the Y-shaped optical transmission path 1222 in FIG. 12 that transmits the same optical signal to groups 1201 and 1202.

Figure 14:
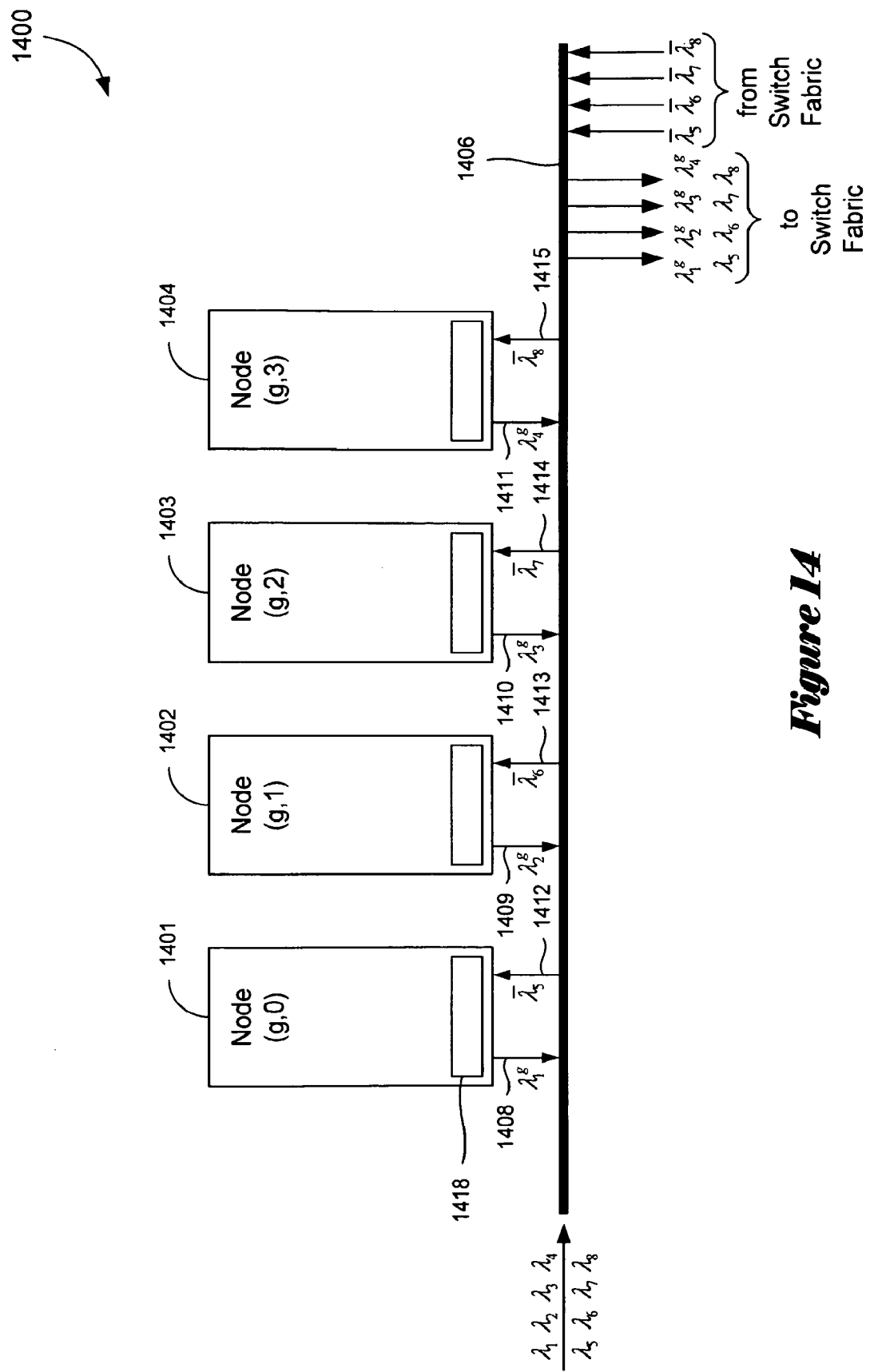
FIG. 14 illustrates an example of a group of nodes that represents one of many embodiments of the present invention.

The frequency channels transmitted by the optical transmission paths in FIG. 12 are divided into a first set of frequency channels and a second set of frequency channels. The first set of frequency channels $\lambda_1, \lambda_2, \lambda_3$, and $\lambda_4$ are modulated by the nodes in the groups 1201-1204 to encode data and are transmitted along with the second set of frequency channels, $\lambda_5, \lambda_6, \lambda_7$, and $\lambda_8$ to the switch fabric 1206 in optical transmission paths 1216-1219. FIG. 14 illustrates an example of a group that represents one of many embodiments of the present invention. In FIG. 14, group 1400 is composed of four nodes 1401-1404, and an optical transmission path 1406. Each node can be a processor, memory, computer server, storage server, an external network connection, a data transmitting device or any electrical circuit or mosaic of electrical circuits having either microscale or nanoscale dimensions. Optical transmission path 1406 can be a waveguide in a photonic crystal that transmits the optical signal comprising the frequency channels $\lambda_1, \lambda_2, \lambda_3, \lambda_4, \lambda_5, \lambda_6, \lambda_7$, and $\lambda_8$ to the nodes 1401-1404.

Each node in the group 1400 is located near a photonic-crystal-based writer, represented by downward directional arrows 1408-1411, that extracts and encodes data in a specific frequency channel of the first set of frequency channels. For example, photonic crystal-base writer 1408 extracts frequency channel $\lambda_1$, encodes data generated by the node 1401 in frequency channel $\lambda_1$ to obtain modulated frequency channel $\lambda_1^g$, and inserts the modulated frequency channel $\lambda_1^g$ into the waveguide 1406, where the superscript, g, identifies the group. For example, the superscript g can be "0," "1," "2," or "3," which are used to identify the groups shown in FIG. 12. The modulated frequency channels $\lambda_1^g, \lambda_2^g, \lambda_3^g$, and $\lambda_4^g$ and the second set of unmodulated frequency channels $\lambda_5, \lambda_6, \lambda_7$, and $\lambda_8$ are transmitted by the waveguide 1406 to the switch fabric 1206 in FIG. 12.

Each node is also located near a photonic-crystal-based reader, identified by upward directional arrows 1412-1415, that extracts the data encoded in the frequency channels $\bar{\lambda}_5, \bar{\lambda}_6, \bar{\lambda}_7$, and $\bar{\lambda}_8$, where the bar represents frequency channels transmitted to the group 1400 by the switch fabric 1206, that have each been encoded with data by the nodes of different groups in the compute cluster 1200. In order for the nodes to communicate with the photonic-crystal-based writers and readers, each node includes an interface, such as interface 1418, comprising a multiplexer/demultiplexer that transmits electrical signals between the internal components of the node and the corresponding attached photonic-crystal-based writer and reader described below.

Figure 15A:
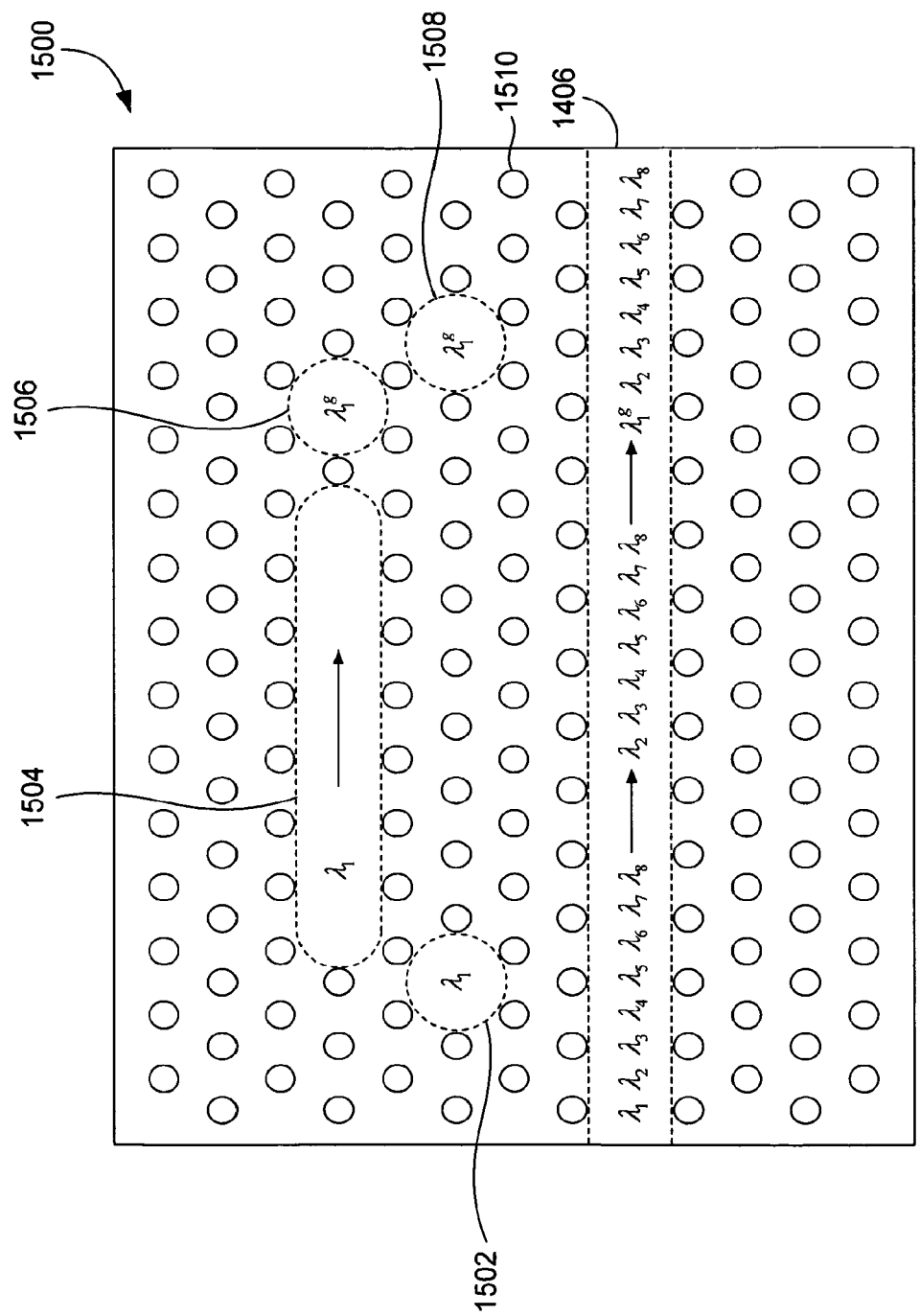
FIG. 15A illustrates a photonic-crystal-based writer that encodes data in a specific frequency channel of an optical signal and that represents one of many embodiments of the present invention.

Photonic-crystal-based writers encode data in a specific frequency channel by extracting the specific frequency channel transmitted by a waveguide, modulating the extracted frequency channel as directed by a node, and inserting the modulated frequency channel into the waveguide to be read by a different node elsewhere in the compute cluster. FIG. 15A illustrates a photonic-crystal-based writer that encodes data in a specific frequency channel of an optical signal that represents one of many embodiments of the present invention. Photonic-crystal-based writer 1500 encodes data in frequency channel $\lambda_1$. The writer 1500 includes a drop filter 1502, a local waveguide 1504, a modulator 1506, an add filter 1508, and a waveguide 1406. The drop filter 1502 is a resonant cavity that extracts and confines the frequency channel $\lambda_1$ via evanescent coupling from the waveguide 1406. The frequency channel $\lambda_1$ evanesces from the drop filter 1502 into the local waveguide 1504 then evanesces from the local waveguide 1504 into the modulator 1506. The modulator 1506 is a resonant cavity, described below with reference to FIGS. 16A-16C, that modulates the frequency channel $\lambda_1$ in accordance with encoding instructions received by the node 1401 to generate the modulated frequency channel $\lambda_1^g$. The add filter 1508 is a resonant cavity that receives the modulated frequency channel $\lambda_1^g$ via evanescent coupling from the modulator 1506 and inserts the modulated frequency channel $\lambda_1^g$ via evanescent coupling into the waveguide 1506.

Figure 15B:
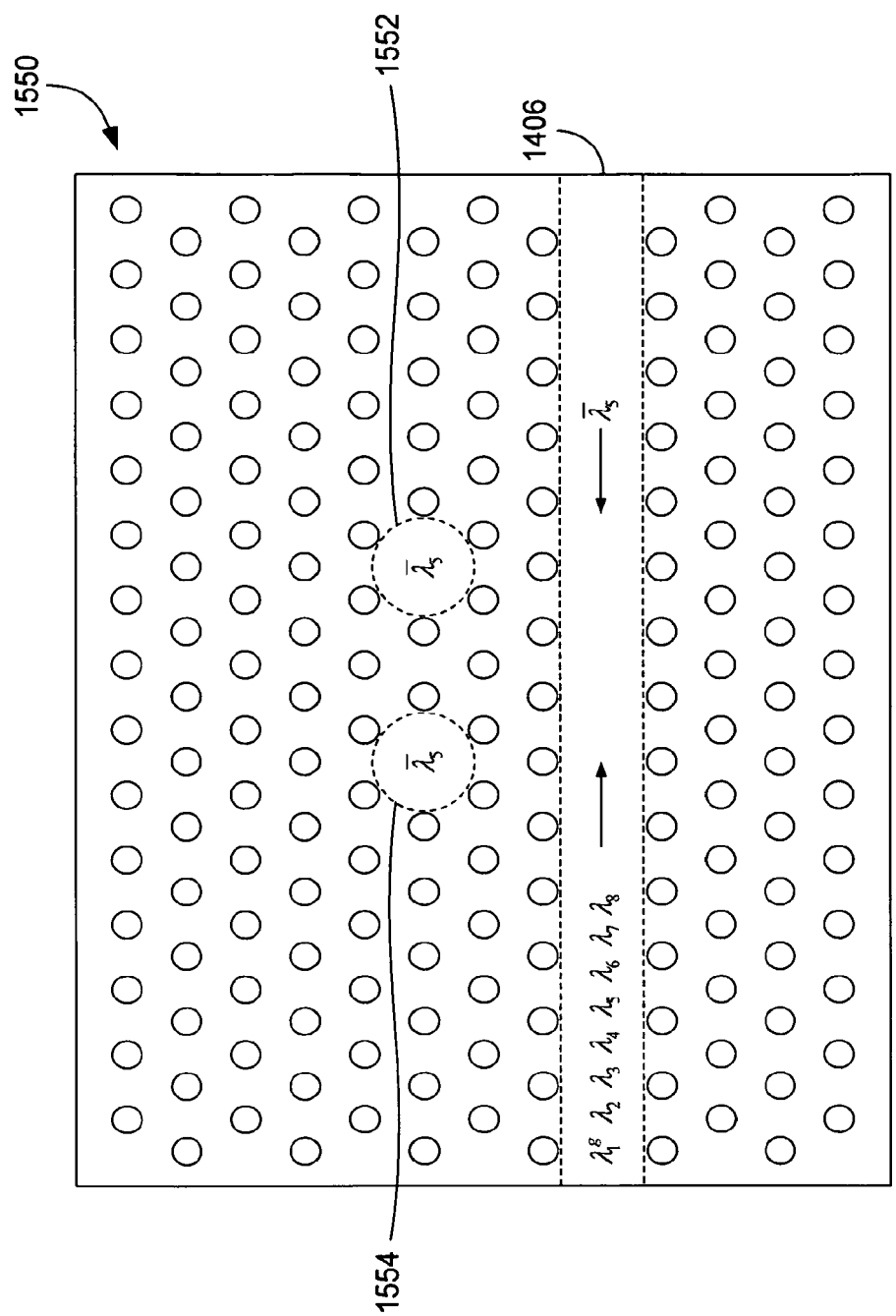
FIG. 15B illustrates a photonic-crystal-based reader that extracts data encoded in a specific frequency channel of an optical signal and that represents one of many embodiments of the present invention.

Photonic-crystal-based readers extract a specific modulated frequency channel written and sent by a different node in the compute cluster. FIG. 15B illustrates a photonic-crystal-based reader that extracts data encoded in a specific frequency channel of an optical signal that represents one of many embodiments of the present invention. Photonic-crystal-based reader 1550 extracts encoded frequency channel $\overline{\lambda}_5$. The reader 1550 includes a drop filter 1552 and a detector 1554. The drop filter 1552 extracts and confines the frequency channel $\overline{\lambda}_5$ via evanescent coupling from the waveguide 1406. The frequency channel $\overline{\lambda}_5$ evanesces from the drop filter 1552 into the demodulator 1554. The demodulator 1554 is a resonant cavity, described below with reference to FIGS. 16A-16C, that includes photodetectors for extracting the digital information carried by the modulated frequency channel $\overline{\lambda}_5$.

In general, the drop filters and the add filters of photonic-crystal-based writers and photonic-crystal-based readers are positioned within a range of evanescent fields emanating from a waveguide. Both drop and add filter diameters and distances to the waveguide can be selected so that the associated resonant cavities are resonators for specific wavelengths carried by the waveguide. For example, the resonant cavities associated with the drop filters 1502 and 1552, shown in FIGS. 15A-15B, are dimensioned and positioned near the waveguide 1406 to extract and confine the frequency channels $\overline{\lambda}_1$ and $\overline{\lambda}_5$, respectively. The add filter 1508, in FIG. 15A, is dimensioned and located near the waveguide 1406 to insert the modulated frequency channel $\lambda_1^g$ into the waveguide 1406. The local waveguide 1504, shown in FIG. 15A, is located near the modulator 1506 so that a large fraction of the frequency channel transmitted by the local waveguide 1504 can be coupled into the modulator 1506. The modulator 1506 is also dimensioned and positioned to create a strong resonant coupling with the add filter 1508, so that the add filter 1508 can insert the modulated frequency channel $\lambda_1^g$ into the waveguide 1406. The dielectric constant of the photonic crystal slab, and the spacing and/or size of the lattice of cylindrical columns surrounding each resonator cavity can be selected so that the drop filters can only extract certain frequency channels. In order to provide strong couplings between a waveguide and drop and add filters, the resonant cavities can be fabricated with high Q factors, such as a Q factor of about 1,000 or larger.

Figure 16A:
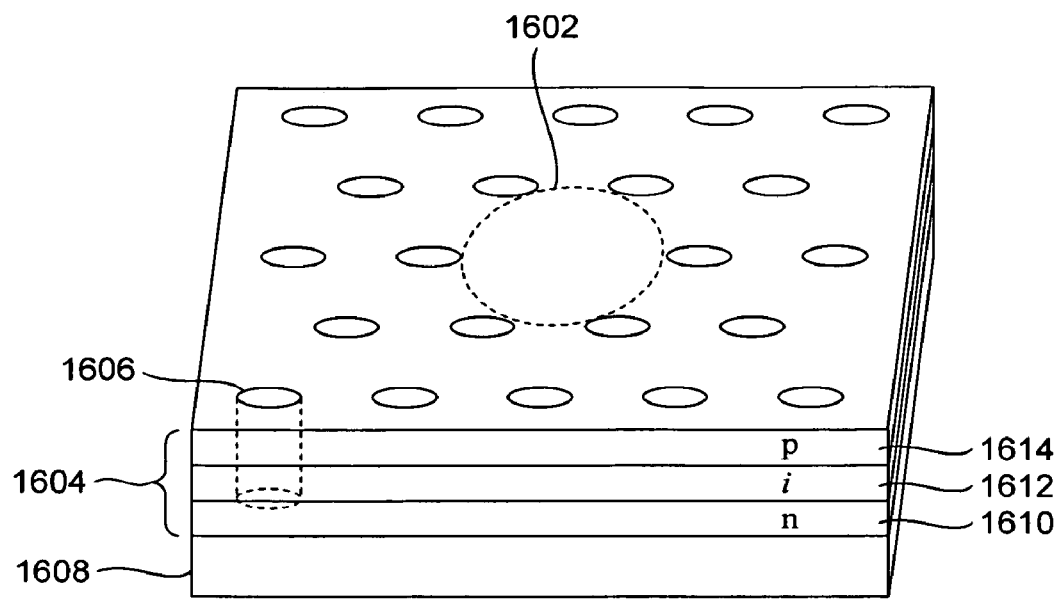
FIG. 16A illustrates a resonant cavity that can be used as either a drop filter or an add filter and that represents one of many embodiments of the present invention.

Drop filters and add filters can be fabricated using a variety of different defects in a photonic crystal. FIG. 16A illustrates a resonant cavity that can be used as either a drop filter or an add filter that represents one of many embodiments of the present invention. In FIG. 16A, a resonant cavity 1602 can be created by omitting a cylindrical column within a regular triangular pattern of cylindrical columns in a photonic crystal slab 1604. The diameter of the resonant cavity 1602 and the pattern and diameter of cylindrical columns surrounding resonant cavity 1602, such as cylindrical column 1606, can be selected to effectively prevent a specific frequency channel from evanescing into the surrounding photonic crystal slab 1604. A resonant cavity may also be fabricated using a cylindrical column having a diameter different from the diameter of surrounding cylindrical columns, and/or filling a cylindrical column with a dielectric material different from the dielectric material of the surrounding cylindrical columns. The photonic crystal slab 1604 is located on top of a glass substrate 1608 and is composed of a positively doped semiconductor layer 1610, an insulating layer 1612 located on top of the semiconductor layer 1610, and a negatively doped semiconductor layer 1614 located on top of the insulating layer 1612. The layers 1614, 1612, and 1610 compose a single layer referred to as a "p-i-n" layer. The dopant concentrations of the p-i-n layers can be any combination of Si, SiO, $SiO_2$, InGaAs, or any other suitable dopant.

Figure 16B:
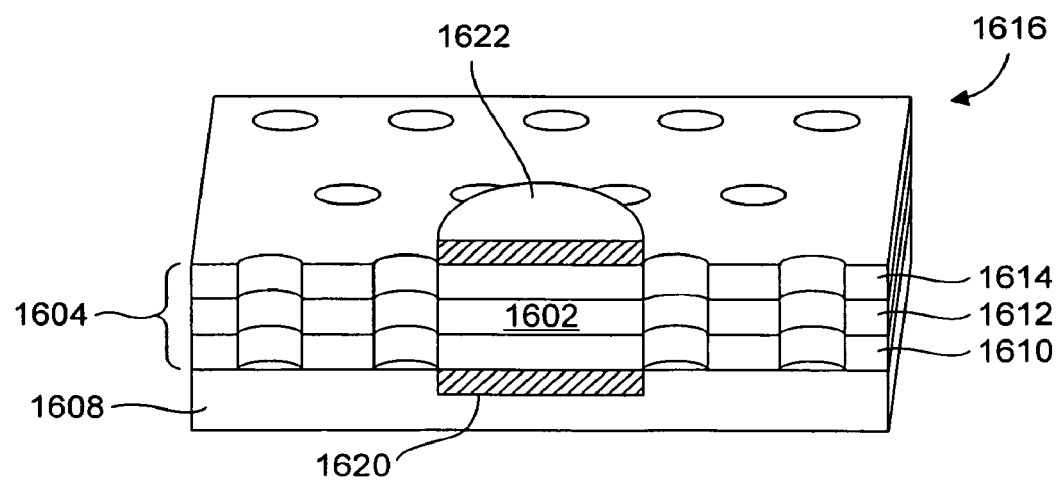
FIG. 16B illustrates a first configuration of a detector/modulator that represents one of many embodiments of the present invention.

Demodulators and modulators can be fabricated at resonant cavities from a variety of different materials. FIG. 16B illustrates a first configuration of a demodulator/modulator that represents one of many embodiments of the present invention. A demodulator/modulator 1616 can be fabricated using a resonant cavity, such as the resonant cavity 1602, sandwiched between two electrodes 1620 and 1622. The electrode 1620 is in contact with the semiconductor layer 1610, and the electrode 1622 is in contact with the semiconductor layer 1614. In order for the demodulator/modulator 1616 to operate as a demodulator, the electrodes 1620 and 1622 collect a varying electrical current generated by variations in the intensity, phase, and/or amplitude of a frequency channel resonating in the resonant cavity 1602. The varying electrical current represents a data stream that can be transmitted from the electrodes 1620 and 1622 to a node interface, such as the interface 1418 in FIG. 14, via signal lines (not shown). The semiconductor layers 1610 and 1614 may have different dopant concentrations or dopant types so that the demodulator/modulator 1616 can operate as a modulator by varying a voltage applied to the electrodes 1620 and 1622. The applied voltage is provided by a node interface to modulate a frequency channel resonating in the resonant cavity 1602 by changing the phase and/or amplitude of the frequency channel.

Figure 16C:
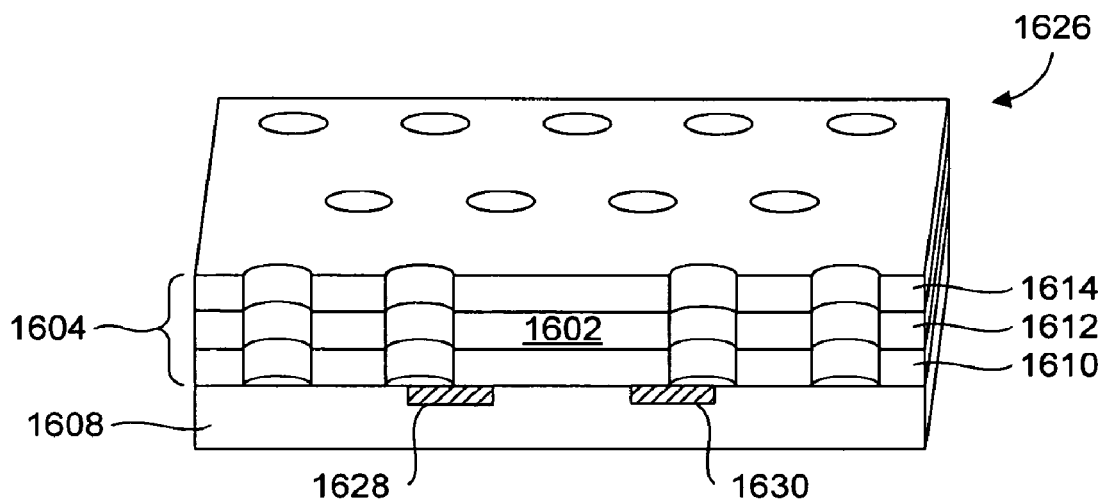
FIG. 16C illustrates a second configuration of a detector/modulator that represents one of many embodiments of the present invention.

FIG. 16C illustrates a second configuration of a demodulator/modulator that represents one of many embodiments of the present invention. Demodulator/modulator 1626 includes the resonant cavity 1602, and two electrodes 1628 and 1630 that are both located under the resonant cavity 1602. The layer 1604 can be composed of the p-i-n layers, described above with reference to FIG. 16A, or a single layer, such as a single layer of lithium niobate, $LiNbO_3$. A demodulator/modulator 1626 operates as a demodulator by collecting a varying electrical current in electrodes 1628 and 1630 that is generated by variations in the intensity, phase, and/or amplitude of a frequency channel resonating in the resonant cavity 1602. The demodulator/modulator 1626 operates as a modulator by varying a voltage applied to the electrodes 1628 and 1630 that, in turn, changes the dielectric constant of the dielectric materials in the resonant cavity 1602 causing a phase and/or amplitude change in a frequency channel resonating in the resonant cavity 1602.

The intrinsic capacitance in demodulator electrode detectors is often low enough that fluctuations in current due to noise generated by thermal agitation of electrons in a conductor, called "Johnson noise," may be insignificant. As a result, statistics associated with an optical signal source dominate the bit error rate ("BER") arising in the serial digital signal corresponding to the output from the detector. For example, a Poisson distribution of an optical signal having 30 photons per bit is sufficient to achieve a BER of less than $10^{-13}$.

Incorporating a doped region into a resonant cavity with a Q factor of 10 to 100 may compensate for the reduced absorption. With an appropriate choice of Q factor to impedance-match, the optical input losses of the cavity to the internal absorption loss of the detector may increase detection efficiency. For example, an increase in the detection efficiency of about 50% may be achieved.

Similar considerations can be applied to the design of a resonant cavity enhanced ("RCE") modulator using electro-optic techniques. Modulation depths as high as 50% may be achieved for a resonant cavity with a Q factor greater than about 1,000. Although other physical effects can be employed, such as variations in the free carrier plasma index, electro-optic modulation can be used with a potential difference of about 30 mV applied across a gap of about 300 nm to produce an electric field of 1 kV/cm, which is sufficient to generate a refractive index change as large as 0.001 in a wide variety of linear dielectric materials.

Figure 17:
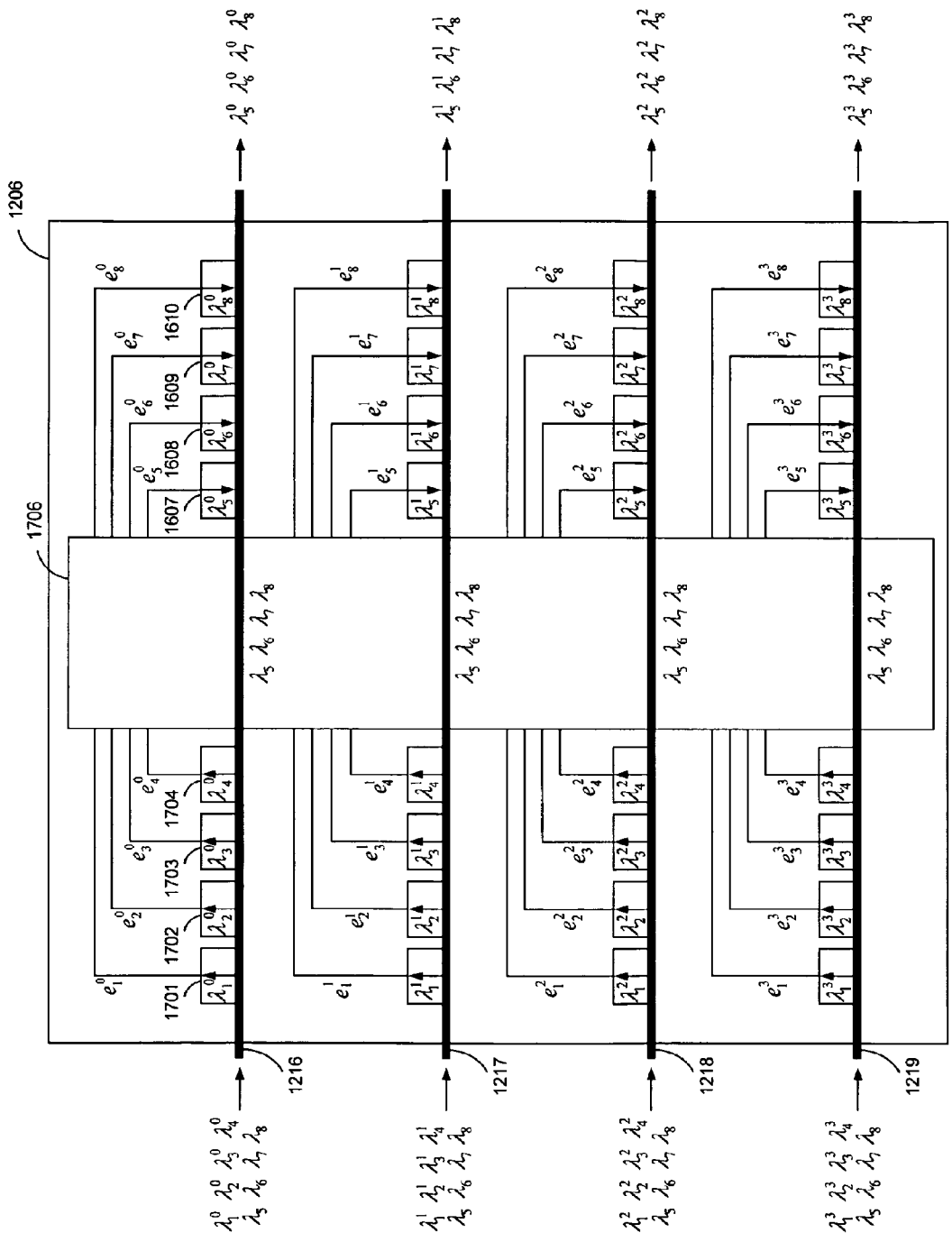
FIG. 17 illustrates a schematic representation of the switch fabric, shown in FIG. 12, that represents one of many embodiments of the present invention.

After the groups have encoded data in half of the frequency channels transmitted by a waveguide, the switch fabric 1206, in FIG. 12, employs the unencoded frequency channels to encode data directed to other nodes within the compute cluster. FIG. 17 illustrates a schematic representation of the switch fabric 1206, shown in FIG. 12, that represents one of many embodiments of the present invention. The switch fabric 1206 receives modulated and unmodulated frequency channels transmitted from the groups 1201-1204 in the waveguides 1216-1219, respectively. Photonic-crystal-based readers, represented by boxes with upward directed arrows, extract the modulated frequency channels transmitted in waveguides 1216-1219, as described above with reference to FIG. 15B. The photonic-crystal-based readers convert the extracted frequency channels into continuous electrical bit streams. An electronic-based switch fabric 1706 directs the bit streams to nodes in the compute cluster 1200, in FIG. 12. For example, photonic-crystal-based readers 1701-1704 extract the modulated frequency channels $\lambda_1^o$, $\lambda_2^o$, $\lambda_3^o$, and $\lambda_4^o$ from waveguide 1216 and convert the modulated frequency channels into electronic input bit streams $e_1^o$, $e_2^o$, $e_3^o$, and $e_4^o$, respectively. The input bits streams $e_1^o$, $e_2^o$, $e_3^o$, and $e_4^o$ are transmitted in signal lines, such as signal line 1705, to the electronic-based switch fabric 1706, where the bit streams are partitioned, assembled, and directed to particular nodes of the compute cluster, as described below with reference to FIGS. 17-18. The output bit streams $e_5^o$, $e_6^o$, $e_7^o$, and $e_8^o$ represent assembled bit streams output by the electronic-based switch fabric 1706. Photonic-crystal-based writers, represented by boxes with downward directed arrows, encode the information in the output bit streams by modulating the unmodulated frequency channels $\lambda_5$, $\lambda_6$, $\lambda_7$, and $\lambda_8$ transmitted in each waveguide. For example, photonic-crystal-based writers 1707-1710 encode the data contained in the output bit steams $e_5^o$, $e_6^o$, $e_7^o$, and $e_8^o$ by modulating the unmodulated frequency channels $\lambda_5$, $\lambda_6$, $\lambda_7$, and $\lambda_8$ to obtain modulated frequency channels $\lambda_5^o$, $\lambda_6^o$, $\lambda_7^o$, and $\lambda_8^o$, respectively. The modulated frequency channels $\lambda_1^o$, $\lambda_2^o$, $\lambda_3^o$, and $\lambda_4^o$ are transmitted in waveguide 1216 to the nodes of group 1201, in FIG. 12.

Figure 18:
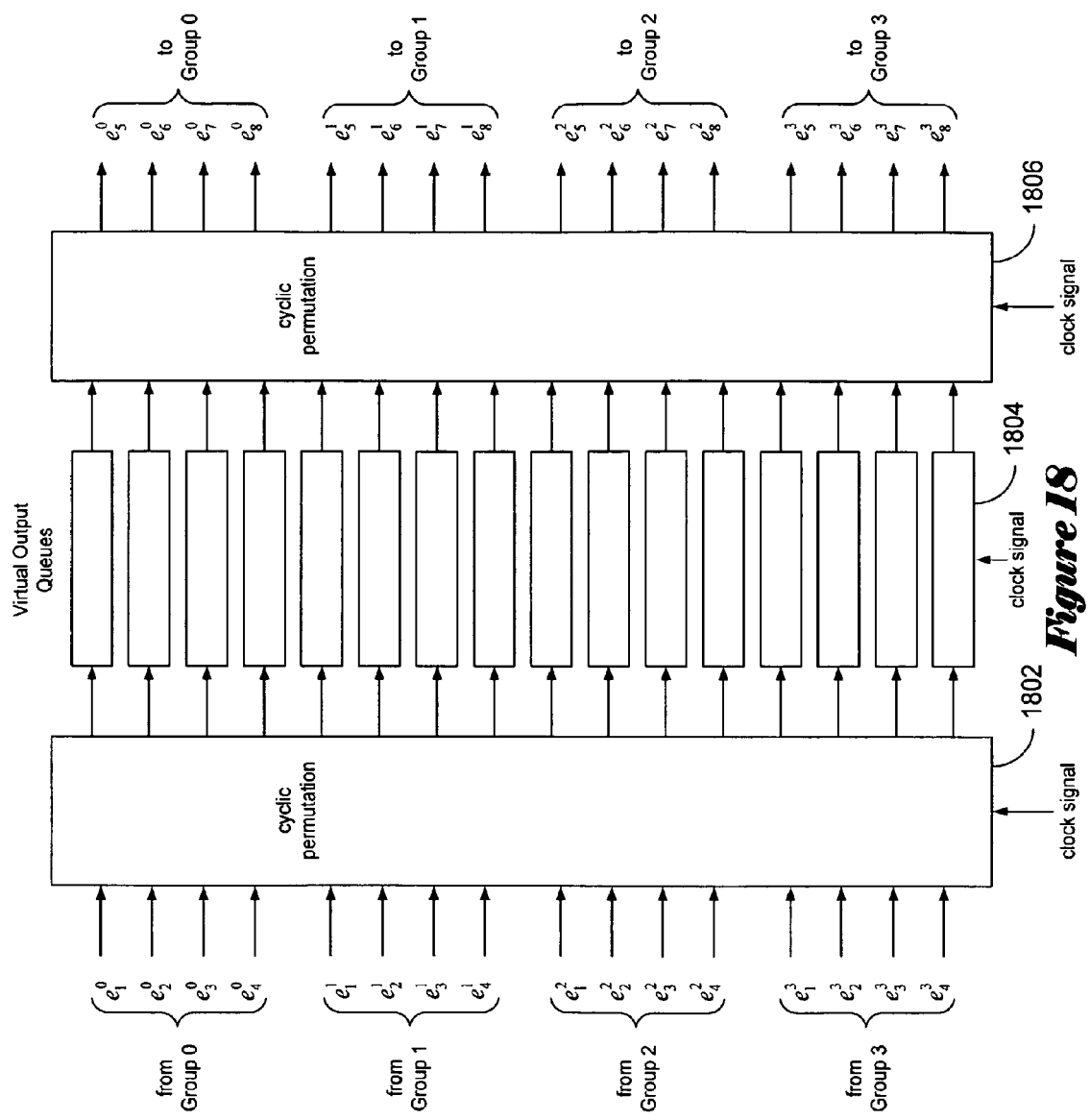
FIG. 18 illustrates an exemplary implementation of an electronic-based switch fabric that represents one of many embodiments of the present invention.

FIG. 18 illustrates an implementation of the electronic-based switch fabric 1706 shown in FIG. 17 that represents one of many embodiments of the present invention. In FIG. 18, the bit streams are passed to a cyclic permutation network 1802. The cyclic permutation network 1802 is composed of a network of signal lines that are used to distribute the bits streams to virtual output queues, as described below with reference to FIGS. 19A-19B. The virtual output queues, such as virtual output queue 1804, receive a continuous bit stream from the cyclic permutation network 1802 and convert the continuous bit stream into parallel words streams that are stored as packets. Each packet includes a group and node address that enables the packet to be directed to a node. Certain packets in each virtual queue are multiplexed in order to assemble continuous bit streams that are transmitted to a cyclic permutation network 1806. The buffering and multiplexing performed by each virtual output queue is described below with reference to FIG. 19. As packets are output from a virtual output queue, the cyclic permutation network 1806 directs the assembled bit streams to appropriate nodes identified by the group and node addresses. The operation of the cyclic permutation networks 1802 and 1806, and the virtual output queues, are synchronized in accordance with the clock signal provided by clock frame 1208, described above with reference to FIG. 12.

Figures 19A, 19B:
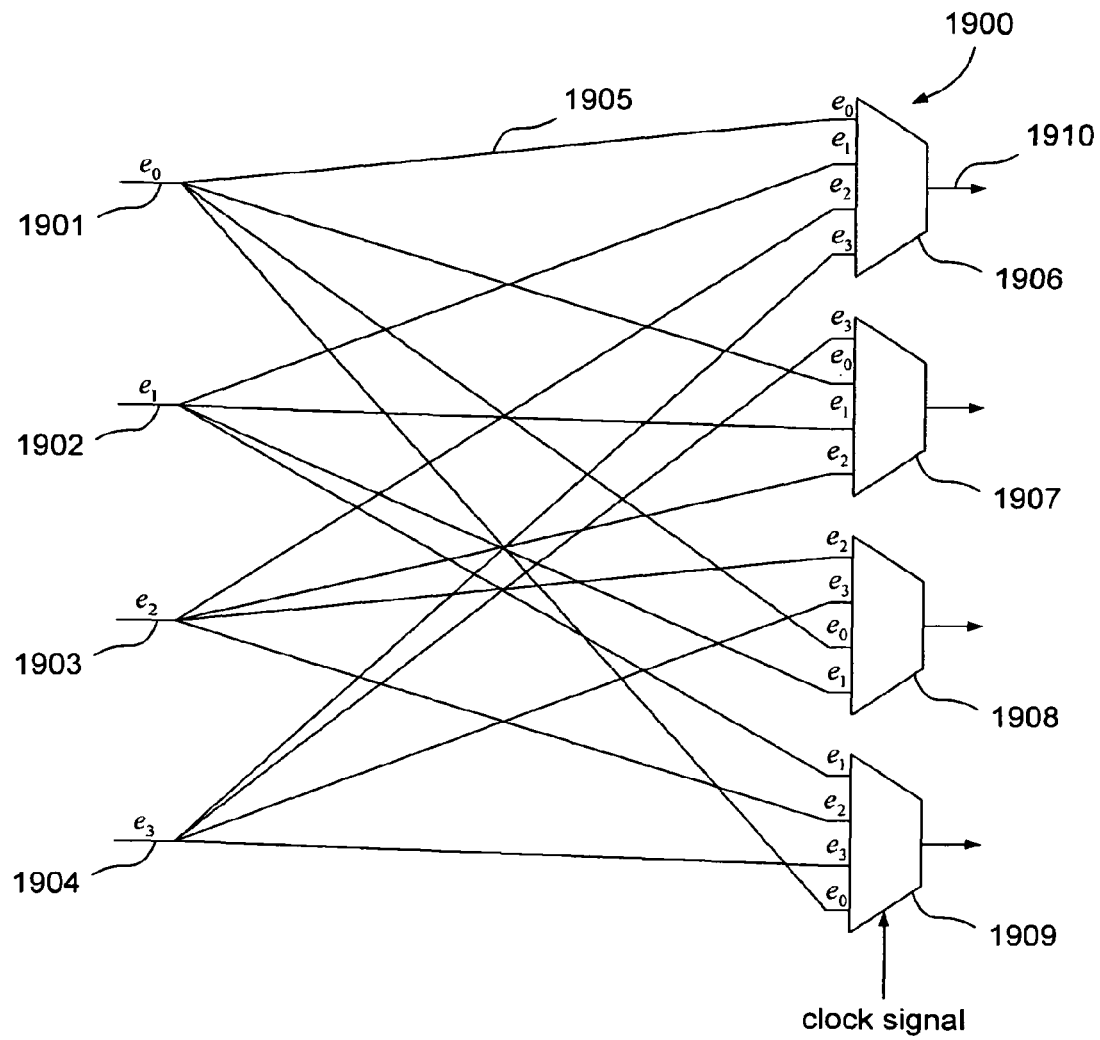
FIG. 19A illustrates an example of a cyclic permutation network that represents one of many embodiments of the present invention.
FIG. 19B illustrates four possible cyclic permutation outputs that can be generated by the cyclic permutation network shown in FIG. 19A and that represents one of many embodiments of the present invention.

FIG. 19A illustrates an example of a cyclic permutation network that represents one of many embodiments of the present invention. Cyclic permutation network 1900 includes inputs 1901-1904 that receive bit streams, $e_0$, $e_1$, $e_2$, and $e_3$. Each input is connected to a set of four different signal lines, such as signal line 1905, that transmit the same bit stream to all four identically configured multiplexers 1906-1909. Each signal line in a set of four different signal lines is connected to a different input address of the multiplexers 1906-1909 by a cyclic permutation shift in the input address order. For example, bit stream $e_0$ is transmitted to the first input address of the multiplexer 1906, the second input address of the multiplexer 1907, the third input address of multiplexer 1908, and the fourth input address of the multiplexer 1909. At each timeslot of the clock signal, a specific input address is sent to the multiplexers 1906-1909, causing the bit stream input at the same input address to be output. For example, the address for the first input address of the multiplexers 1906-1909 is sent to each multiplexer at the same time causing the bit streams $e_0$, $e_3$, $e_2$, and $e_1$, to be output simultaneously from the multiplexers 1906-1909, respectively. FIG. 19B illustrates four possible cyclic permutation outputs that can be generated by the cyclic permutation network 1900 shown in FIG. 19A. The cyclic permutation network is not limited to four inputs. In alternate embodiments, cyclic permutation networks can be fabricated to permute M different bit streams to M identically configured multiplexers, each multiplexer having M different input addresses, where M is any positive integer.

Figure 20:
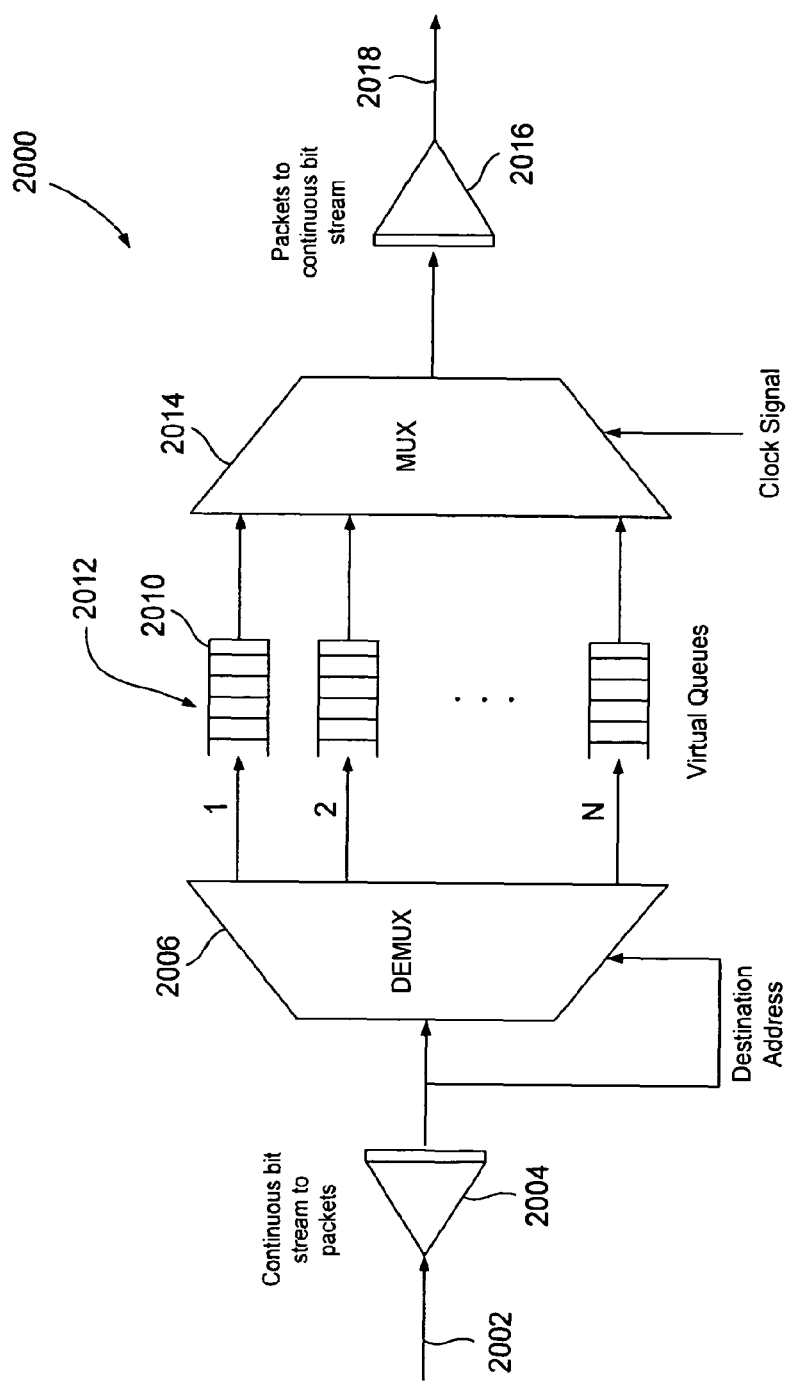
FIG. 20 illustrates an implementation of a hypothetical virtual output queue that represents one of many embodiments of the present invention.

FIG. 20 illustrates an implementation of an exemplary virtual output queue that represents one of many embodiments of the present invention. In FIG. 20, virtual output queue 2000 receives a continuous bit stream that is represented by directional arrow 2002. A converter 2004 partitions the bit stream 2002 into packets that are transmitted to a demultiplexer 2006. The converter 2004 also assigns an address in the form a additional bit stream to each packet that identifies a node and group for which each packet is to be sent for processing. The demultiplexer 2006 receives the packets and buffers each packet into a virtual output queue according to the address assigned to each packet. For example, the packets, such as packet 2010, are buffered in a buffer 2012, and each packet has the same node and group address. A multiplexer 2014 cycles through each of the virtual queues, one queue per timeslot of the clock signal, dequeues packets with the same node and group address, then transmits the dequeued packets to a converter 2016. The converter 2016 assembles the dequeued packets into a continuous bit stream, represented by directional arrow 2018, and transmits the continuous bit stream to the appropriate node and group identified by the address for processing.

Although the present invention has been described in terms of particular embodiments, it is not intended that the invention be limited to these embodiments. Modifications within the spirit of the invention are apparent to those skilled in the art. For example, in an alternate embodiment of the present invention, the photonic interconnection signaling systems can instead be employed to implement quantum systems that manipulate quantum states, such as qubits, qudits, or qunits. In an alternate embodiment of the present invention, the optical signals transmitted by waveguides can represent quantum information, and node interfaces can route selected optical signals to nanoscale electronic circuits, or convert the optical signals into a form suitable for the nanoscale electronic circuits. In an alternate embodiment of the present invention, photonic-interconnection-based compute cluster can be used in quantum information processing using optical pulse control of electron-spin-based semiconductor quantum computers. In semiconductor quantum computers, each qubit can be represented by a spin state of a single electron or a quantum dot. A quantum dot represents the presence or absence of a single electron. A quantum dot can be created using any substance that allows for detection of a single electron, such as a semiconductor, a metal, an atom, or a molecule. Single-qubit and two-qubit logical operations are implemented by applying optical control pulses to particular quantum dots. Semiconductor quantum computers combine quantum optics and spintronics, which includes precise control provided by lasers, the availability of resonance-fluorescence measurements, and the long spin coherence times of electrons in semiconductors. An application of the architecture shown in FIG. 12 can be applied to an electron-spin-based semiconductor quantum computer to send a laser control pulse that a drop-filter extracts for application to a target quantum dot, represented by a node in FIG. 14. As a result, the target quantum dot can perform a logic operation on the qubit, or between the qubit and a qubit in a neighboring quantum dot.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purposes of illustration and description. They are not intended to be exhaustive or to limit the invention to the precise forms disclosed. Obviously, many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

What is claimed is:

1. A compute cluster comprising:
   a photonic interconnection having one or more branching optical transmission paths for transmitting independent frequency channels within an optical signal to each node in a set of nodes;
   one or more photonic-interconnection-based writers, each writer associated with a particular node and disposed adjacent to one of the branching optical transmission paths, each writer enodes information generated by the associated node into one of a first subset of the independent frequency channels that travel in the transmission paths in a first direction;
   a switch fabric that receives the first subset of independent frequency channels and encodes the information encoded in the first subset into a second subset of the independent frequency channels and sends the second subset on the transmission paths to the one or more nodes in a second direction, the second direction opposite the first direction; and
   one or more photonic-interconnection-based readers, each reader associated with a particular node and disposed adjacent to one of the branching optical transmission paths, each reader extracts the information encoded in one of the encoded independent frequency channels of the second subset directed to the associated node for processing.

2. The compute cluster of claim 1 further comprising a clock signal source.

3. The compute cluster of claim 2 wherein the switch fabric further comprises one or more cyclic permutation networks for distributing continuous bit streams of information and one or more virtual output queues for queuing packets of information into one or more buffers.

4. The compute cluster of claim 1 wherein the nodes further comprise any one of a processor, memory, computer server, storage server, an external network connection, a data transmitting device or any electrical circuit or mosaic of electrical circuits.

5. The compute cluster of claim 4 where the electrical circuits have microscale dimensions or nanoscale dimensions.

6. The compute cluster of claim 1 wherein the photonic interconnection further comprises a two-dimensional photonic crystal with waveguides, a number of independent optical fibers, or free space.

7. The compute cluster of claim 1 wherein the photonic-interconnection-based writer further comprises:
   a drop filter that extracts a frequency channel from the optical transmission path,
   a local waveguide that extracts the frequency channel from the drop filter and transmits the frequency channel,
   a modulator that extracts the frequency channel from the local waveguide and produces a modulated frequency channel by modulating the frequency channel, and
   an add filter that extracts the modulated frequency channel and inserts the modulated frequency channel into the optical transmission path.

8. The compute cluster of claim 1 wherein the photonic-interconnection-based reader further comprises;
   a drop filter that extracts a frequency channel from the optical transmission path, and
   a detector that extracts the frequency channel from the drop filter and demodulates the information encoded in the frequency channel.

9. A switch fabric comprising:
   one or more optical transmission paths that each transmit a first set of independent frequency channels and a second set of independent frequency channels, the first set of independent frequency channels encoding information output by nodes in a compute cluster and travel in the one or more optical transmission paths in a first direction;
   one or more photonic-interconnection-based readers, each reader extracting a frequency channel in the first set of independent frequency channels and encoding the information into one or more electronic input bit streams;
   an electronic-based switch fabric that partitions and assembles the electronic input bit streams into electronic output bit streams, each electronic output bit stream directed to a particular node in the compute cluster; and one or more photonic-interconnection-based writers, each encoding the information encoded in the electronic output bit streams into frequency channels in the second set of independent frequency channels, the second set travel in the one or more optical transmission paths in a second direction, the second direction opposite the first direction.

10. The switch fabric of claim 9 further comprising a clock signal source.

11. The switch fabric of claim 10 wherein the switch fabric further comprises one or more cyclic permutation networks for distributing continuous bit streams of information and one or more virtual output queues for queuing packets of information into one or more buffers.

12. The switch fabric of claim 9 wherein the nodes further comprise any one of a processor, memory, computer server, storage server, an external network connection, a data transmitting device or any electrical circuit or mosaic of electrical circuits.

13. The switch fabric of claim 12 where the electrical circuits have microscale dimensions or nanoscale dimensions.

14. The switch fabric of claim 9 wherein the photonic interconnection further comprises a two-dimensional photonic crystal with waveguides, a number of independent optical fibers, or free space.

15. A method for transmitting data between nodes in a compute cluster, the method comprising:
    providing a photonic interconnection having one or more branching transmission paths that lead to each node in the computer cluster;
    generating a first set of independent frequency channels and a second set of independent frequency channels, both sets of independent frequency channels are transmitted in the optical transmission paths to the nodes in opposite directions;
    encoding information generated by the nodes into the frequency channels in the first set of independent frequency channels;
    transmitting the encoded information to a switch fabric that partitions and assembles the information encoded in the first set of frequency channels and encodes the assembled information into the second set of independent frequency channels; and
    directing the second set of independent frequency channels to the nodes so that the assembled information can be processed.

16. The method of claim 15 further comprising providing a clock signal that synchronizes transmission of information between nodes in the compute cluster.

17. The method of claim 16 wherein providing the switch fabric further comprises providing one or more cyclic permutation networks for distributing continuous bit streams of data and one or more virtual output queues for queuing packets of data into one or more buffers.

18. The method of claim 15 wherein the node further comprises any one of a processor, memory, computer server, storage server, an external network connection, a data transmitting device or any electrical circuit or mosaic of electrical circuits.

19. The method of claim 18 where the electrical circuits have microscale dimensions or nanoscale dimensions.

20. The method of claim 15 wherein the photonic interconnection further comprises a two-dimensional photonic crystal with waveguides, a number of independent optical fibers, or free space.

* * * * *

UNITED STATES PATENT AND TRADEMARK OFFICE
CERTIFICATE OF CORRECTION

PATENT NO. : 7,720,377 B2  Page 1 of 1
APPLICATION NO. : 11/337328
DATED : May 18, 2010
INVENTOR(S) : Gregory S. Snider et al.

It is certified that error appears in the above-identified patent and that said Letters Patent is hereby corrected as shown below:

In column 17, line 64, in Claim 1, delete "enodes" and insert -- encodes --, therefor.

In column 18, line 47, in Claim 8, delete "comprises;" and insert -- comprises: --, therefor.

In column 19, line 32, in Claim 15, delete "computer" and insert -- compute --, therefor.

Signed and Sealed this

Second Day of November, 2010

David J. Kappos
*Director of the United States Patent and Trademark Office*